United States Patent

Bauman et al.

[11] Patent Number: 6,160,812
[45] Date of Patent: Dec. 12, 2000

[54] METHOD AND APPARATUS FOR SUPPLYING REQUESTS TO A SCHEDULER IN AN INPUT BUFFERED MULTIPORT SWITCH

[75] Inventors: James A. Bauman, San Jose; Eric T. Anderson, Sunnyvale, both of Calif.

[73] Assignee: Cabletron Systems, Inc., Rochester, N.H.

[21] Appl. No.: 09/072,147

[22] Filed: May 4, 1998

[51] Int. Cl.[7] .................................................. H04L 12/56
[52] U.S. Cl. ........................ 370/416; 370/230; 370/398; 370/429; 710/39; 710/40
[58] Field of Search ................................... 370/229, 230, 370/412, 415, 418, 419, 395, 398, 422, 428, 429; 710/36, 39, 40, 49, 50

[56] References Cited

U.S. PATENT DOCUMENTS

| | | |
|---|---|---|
| 5,241,536 | 8/1993 | Grimble et al. ........................ 370/412 |
| 5,255,265 | 10/1993 | Eng et al. .................................. 370/60 |
| 5,267,235 | 11/1993 | Thacker .................................... 670/60 |
| 5,500,858 | 3/1996 | McKeown ............................... 370/412 |
| 5,517,495 | 5/1996 | Lund et al. ............................... 370/60 |
| 5,634,015 | 5/1997 | Chang et al. ............................ 395/309 |

*Primary Examiner*—Chi H. Pham
*Assistant Examiner*—Frank Duong
*Attorney, Agent, or Firm*—Law Offices of Mark A. Wilson; Mark A. Wilson

[57] ABSTRACT

A method and apparatus for supplying new requests to a scheduler in an input-buffered multiport switch involve selecting a request that does not target output channels that conflict with output channels targeted by requests that are already accessible to the scheduler. Specifically, target output channels of requests that are presently accessible to the scheduler are identified and compared to target output channels of requests that are included in a queue of next-in-line requests. The queue of next-in-line requests is reviewed and the highest priority request having no conflicting output channels is supplied to the scheduler. By supplying the scheduler with a new request that targets non-conflicting output channels, the scheduler is presented with a wider range of requested output channels from which to choose in each arbitration cycle. In a first embodiment, one, two, or eight ports are connected to each one of four input/output controllers in a switch having a four-channel switch fabric. To supply the scheduler with new requests, secondary arbitration is performed on a channel-specific basis in order to supply channel-specific requests to the scheduler. The method of supplying requests to the scheduler can be scaled to include multiple channels and multiple packet priority designations.

20 Claims, 23 Drawing Sheets

|        | RQ_CH0 | RQ_CH1 | RQ_CH2 | RQ_CH3 |
|--------|--------|--------|--------|--------|
| L3     | 1100   | 0001   | 1111   | 0001   |
| L2     | 1000   | 0010   | 0000   | 1110   |
| L1     | 0001   | 0010   | 0010   | 1000   |
| L0     | 1000   | 0000   | 0000   | 0001   |

FIG. 9

```
RQ_CH0_L0        1000
RQ_CH1_L0        0000
RQ_CH2_L0        0000
RQ_CH3_L0        0001
                 ----
L1_MASK          1001
```

FIG. 10A

```
RQ_CH0_L1            0001
RQ_CH1_L1            0010
RQ_CH2_L1            0010
RQ_CH3_L1            1000
                     ----
L1 AGGREGATE 1011
L1_MASK              1001
                     ----
L2_MASK              1011
```

FIG. 10B

```
RQ_CH0_L2            1000
RQ_CH1_L2            0010
RQ_CH2_L2            0000
RQ_CH3_L2            1110
                     ----
L2 AGGREGATE 1110
L2_MASK              1011
                     ----
L3_MASK              1111
```

FIG. 10C

```
               IVEC  0 1 0 0
         RQ_CH2_L1  0 0 1 0
RESULTING RQ_CH2_L1  0 0 1 0
          L1_MASK  1 0 0 1
          ─────────────────
    NEW RQ_CH2_L1  0 0 1 0
```

FIG. 11B

```
               IVEC  0 1 0 0
               OVEC  0 0 0 1
    NEW RQ_CH2_L1  0 0 1 0
          ─────────────────
    GRANT_CH2_L1  0 0 1 0
     IVEC_NEXT_L1  0 1 1 0
     OVEC_NEXT_L1  0 0 1 1
```

FIG. 12

```
               IVEC  0 1 0 0
         RQ_CH1_L1  0 0 1 0
RESULTING RQ_CH1_L1  0 0 0 0
          L1_MASK  1 0 0 1
          ─────────────────
    NEW RQ_CH1_L1  0 0 0 0
```

FIG. 11A

METHOD AND APPARATUS FOR SUPPLYING REQUESTS TO A SCHEDULER IN AN INPUT BUFFERED MULTIPORT SWITCH

TECHNICAL FIELD

The invention relates generally to the scheduling of packets in a high-bandwidth input-buffered multiport switch, for instance as used in gigabit ethernet networks. More particularly, the invention describes a process for supplying requests to a scheduler.

BACKGROUND OF THE INVENTION

Networks are widely used to transfer voice, video, and data between various network devices such as telephones, televisions, and computers. Data transmitted through a network is typically segmented into packets and under some network protocols data is segmented into fixedlength cells. For example, Asynchronous Transfer Mode (ATM) protocol requires 53-byte cells, with 5 bytes of each cell designated for a header and 48 bytes of each cell designated for payload. Other network protocols, such as ethernet or Internet protocol, carry data in variable-size packets.

Switches are integral parts of most networks. Switches receive packets from input channels and direct packets to the appropriate output channels of the switch. Typical switches have three components: a physical switch fabric to provide the connections from input channels to output channels, a scheduling mechanism to direct traffic when multiple packets arrive on different input channels destined for the same output channel, and a buffering or queuing mechanism at the switch input or output to accommodate traffic fluctuations without undue packet loss. FIG. 1 is a diagram of a prior art switch 10 that has four input channels 12, 14, 16 and 18 and four output channels 20, 22, 24 and 26. The switch has serial input queues 28, 30, 32 and 36 for each input channel, a crossbar physical switch 38, and a crossbar scheduler 40. The crossbar scheduler receives a signal, referred to as a request, from an input queue. The request dictates the output channel or channels that will receive the queued packet. The scheduler arbitrates between competing requests and sends a signal, referred to as a grant, back to the input buffers that have been selected to deliver a packet.

In switches such as the switch 10 described in reference to FIG. 1, each input queue 28–36 provides requests to the scheduler 40 one at a time on a first-in-first-out (FIFO) basis and the scheduler arbitrates among the four requests received from the four input queues, with a goal of maximizing utilization of the input channels 12–18 and output channels 20–26 of the switch. As a grant is issued to a particular input channel to access a target output channel or channels, a new request is accessible by the scheduler in place of the granted request.

A problem known as head-of-line (HOL) blocking is created when one of the requests at the head of a queue line is a request for an output channel that is not available. HOL blocking is common when a multicast request (i.e., a request for a packet to be simultaneously sent to more than one output channel) is made because there is a lower probability that all of the output channels for the multicast request will be available immediately. When a request from a particular input channel is forced to wait until all output channels are available, all of the packets associated with the particular input channel are also forced to wait, thereby slowing the transfer of data from that input channel.

As one remedy to HOL blocking problems, parallel input queues have been implemented in switching arrangements. Parallel input queues provide a separate FIFO queue for each output channel of the switch, with each queue providing a corresponding request to the scheduler. Referring to FIG. 2, an N input channel by N output channel switch requires N input queues 46 for each input channel for a total of $N^2$ input queues. With an $N^2$ scaling factor, the number of input queues connected to the crossbar scheduler 50 may be very high. For example, in a 16X16 switch, 256 separate queues are required. In spite of the added complexity, the advantage that the parallel design provides is that, with respect to any one of the input channels, a series of requests for available output channels is not held up by a single request for in-use output channels.

A variety of arbitration techniques can be used with parallel input channels to provide an efficient throughput through a switch. For example, maximum matching algorithms are designed in an attempt to assign output channels to input channels in such a way that a maximum number of transfers occur simultaneously. However, under heavy load conditions, maximum matching algorithms can prevent some requests from being granted, creating a new blocking problem. For example, referring to FIG. 3, input channel 1 is represented as requesting to transfer cells from its output-distributed queue 54 to output channel 1 only, while input channel 2 is requesting to transfer cells from its output-distributed queue 56 to output channels 1 and 2. Under a maximum matching approach, input channel 1 transmits cells to output channel 1 and input channel 2 transmits cells to output channel 2. However, input channel 2 will be blocked from transferring cells destined for output channel 1, since this would require the cell transfer from input channel 1 to output channel 1 to stop, and as a result, only output channel 1 would be utilized. As shown in FIG. 4, sending cells from input channel 2 to output channel 1 causes input channel 1 and output channel 2 to remain idle and does not achieve maximum matching.

Arbitration methods developed to optimize performance of high speed switches utilizing parallel input queues are disclosed in U.S. Pat. No. 5,500,858, entitled "Method and Apparatus for Switching Cells in an Input-Queued Switch," issued to McKeown and in U.S. Pat. No. 5,517,495, entitled "Fair Prioritized Scheduling in an Input-Buffered Switch," issued to Lund et al. Although these arbitration approaches are effective for their intended purpose, they both require that an NXN switch have $N^2$ distinct FIFO input queues. Since there are $N^2$ distinct FIFO input queues, there will also be $N^2$ requests delivered to the scheduler. As the number of input and output channels increases, the complexity of providing $N^2$ input queues and sending $N^2$ requests to the scheduler becomes costly and difficult to implement.

In addition to the problem of added complexity, the output-distributed queue architecture does not easily support multicast requests, which are more common in network protocols such as ethernet than in network protocols such as ATM. For example, in order to utilize the output-distributed architecture of FIG. 2 to satisfy a multicast request, the cell that is to be multicasted must either be replicated into all of the output channel queues that are indicated by the request or a separate multicast queue must be established in addition to the $N^2$ queues already present.

As a result of the shortcomings of conventional output-distributed queue architecture, what is needed is a method and apparatus that limit the number of input queues and the complexity of sending requests to a scheduler, while still maintaining fair and efficient scheduling.

SUMMARY OF THE INVENTION

A method and apparatus for supplying new requests to a scheduler in an input-buffered multiport switch involve selecting a request that does not target output channels that conflict with output channels targeted by requests that are already supplied to the scheduler. Specifically, output channels that are presently accessible to the scheduler are identified and compared to requested output channels that are included in a queue of next-in-line requests. The queue of next-in-line requests is reviewed and the highest priority request having no conflicting output channels is supplied to the scheduler. By supplying the scheduler with a new request that targets non-conflicting output channels, the scheduler is presented with a wider range of requested output channels from which to choose in each arbitration cycle.

In a preferred embodiment, one, two, or eight ports are connected to each of four input/output (I/O) controllers in a switch having a four-channel switch fabric. Within each I/O controller, the elements involved in supplying new requests to the "primary" scheduler include a request queue or queues, a queue manager, a secondary scheduler, and a copy of the requests that are accessible to the primary scheduler. The scheduler is referred to as the primary scheduler in order to distinguish it from the secondary scheduler.

The request queues within each I/O controller relate on a one-to-one basis to the ports that are connected to the I/O controller. For example, in the case of only one port, all requests from that one port are queued in a single request queue. Likewise, when eight ports are connected to the I/O controller, there are eight separate request queues that store requests related to the respective ports. In the preferred embodiment, the request queues are time-ordered queues.

The queue managers within each I/O controller manage the transfer of requests between the request queues, the primary scheduler, and the secondary scheduler. The queue managers also supply a copy of the primary arbitration queue to the secondary scheduler for secondary arbitration purposes.

The secondary schedulers are the units that determine which requests, from the group of next-in-line requests that are stored in the request queues, will be supplied to the primary arbitration queue when a new request is needed by the primary scheduler. Although all of the secondary schedulers operate in a similar manner, there are configuration differences between the secondary schedulers based on the number of ports connected to the I/O controller and the number of packet priorities that are supported within the switch. The secondary scheduling process is briefly discussed in relation to the one-port, two-port, and eight-port cases, and it will become apparent to one of ordinary skill in the art that similar approaches can be taken when a different number of ports are connected to an I/O controller.

The preferred architecture in an I/O controller which has one port connected to the I/O controller and supports a packet priority scheme within the switch that is only based upon time includes a single request queue containing at least twelve requests and a primary arbitration queue containing up to four requests. When the primary arbitration queue grants a request during the arbitration process, the queue must be supplied with a new request. The secondary scheduler arbitrates among the sequence of requests in its request queue that begins with the oldest request that is not in the primary arbitration queue. The goal of the secondary scheduler is to select the oldest request that is requesting an output channel or output channels that do not conflict with the output channels that are presently being requested by requests held in the primary arbitration queue. The secondary scheduler is in communication with the queue manager, which has access to a copy of the output channels that are requested by the primary arbitration queue. The secondary scheduler goes through an arbitration process that involves comparing the requests in the secondary scheduler to the output channels requested in the primary arbitration queue selecting the oldest non-conflicting request. An advantage of the arbitration method is that the primary scheduler is presented with a more diverse primary arbitration queue from which to select packets for transfer through the switch.

The preferred architecture within an I/O controller for supplying the scheduler with a new request in the case in which two ports are connected to the I/O controller includes a request queue for each of the two connected ports and two four-deep secondary arbitration queues within the secondary scheduler. The secondary arbitration queues contain the sequence of requests that start with the oldest request that is not included in the primary arbitration queue. The sequence of four requests from each request queue are interlaced in an alternating fashion within the secondary scheduler to create a combined secondary arbitration queue that has requests from both queues, preferably four requests from each queue for a total of eight requests. The time relationship is maintained between requests from the same request queue, but there is riot necessarily a time relationship between the requests of the two queues.

The secondary scheduler arbitrates between the eight requests in the combined secondary arbitration queue. The secondary scheduler supplies the primary arbitration queue with the oldest request that targets output channels that are different than the output channels targeted in the primary arbitration queue. In one difference from the one-port case, an arbitration priority is established between the requests from the two request queues. The requests from the two queues are interlaced such that the oldest request from one queue is assigned the highest priority until a request from that queue is supplied to the primary arbitration queue. The higher priority is then switched to the requests from the other queue.

The preferred architecture within an I/O controller for supplying the scheduler with a new request in the case in which eight ports are connected to the I/O controller includes eight request queues and one request, preferably the oldest request, from each of the eight request queues stored within the secondary scheduler. The eight requests stored within the secondary scheduler are used to create a combined secondary arbitration queue that contains eight requests. The eight requests do not necessarily have a time relationship among each other, and they are ordered based on their designated port numbers. Arbitration priority among the requests of the combined secondary arbitration queue is determined on a rotating round-robin basis. One port containing a request is identified by an arbitration pointer as the highest arbitration priority until the request associated with that port meets the arbitration requirements and is delivered to the primary arbitration queue. The arbitration pointer is advanced to the next valid request in input port order each time a highest arbitration priority request is supplied to the primary arbitration queue. The arbitration process is the same as the process used in the one- and two-port cases, in that the highest priority request targeting output channels that do not conflict with output channels targeted by the primary arbitration queue is selected to be supplied to the primary arbitration queue when a new request is needed by the primary arbitration queue.

The preferred architecture within an I/O controller for supplying the scheduler with a new request in the case in which one port is connected to the I/O controller and the switch supports four different packet priority levels includes four request queues, one queue for each of the four different packet priority levels. In addition, the secondary scheduler maintains an eight-deep request queue for each packet priority level. The arbitration approach of the secondary scheduler is based on the packet priority of the requests and the age of the requests relative to other requests of the same packet priority. For example, when a new request is needed in the primary arbitration queue, the highest packet priority queue in the secondary scheduler that contains requests is reviewed first and the oldest non-conflicting request in the queue is selected and supplied to the primary arbitration queue. If there are no qualifying requests stored in the highest priority queue, the primary arbitration queue will not be supplied with a new request unless the primary arbitration queue is below a minimum request threshold. When the highest priority queue contains only conflicting requests, lower priority queues are not reviewed in an attempt to reserve queue space for the highest priority requests. In cases in which there are more than one port connected to the I/O controller and more than one packet priority level, the arbitration process of the secondary scheduler is similar to the case just described and can be easily scaled by one of ordinary skill in the art.

In a preferred embodiment of the invention, a minimum request threshold is established for the primary arbitration queues. The minimum request threshold is a channel-by-channel programmable value that dictates the minimum number of requests that should be maintained in the primary arbitration queue at any time, as long as there are pending requests available. In the preferred embodiment, minimum request thresholds of two and four requests are utilized for the one and two port and the eight-port channels, respectively. The minimum request threshold becomes important to filling the primary arbitration queue when the number of requests in the primary arbitration queue falls below the minimum request threshold. When the primary arbitration queue falls below the minimum request threshold, the queue is filled from the secondary scheduler with the next oldest non-conflicting request or the next oldest conflicting request if there are no non-conflicting requests available. This override of the queuing algorithm is put in place to avoid the situation where conflicting requests are not supplied to the primary arbitration queue, and because of latency in the system, an arbitration cycle is performed without a request present.

As stated above, the primary advantage of the secondary arbitration process is that the primary arbitration queue is supplied with a new request that targets output channels that do not conflict with output channels targeted by requests that are already present in the primary arbitration queue. Because the primary arbitration queue is supplied with a broader distribution of targeted output channels, the primary scheduler will have more channels to select from when scheduling packets through the switch which becomes more important as the number of channels in the switch fabric increases. By providing a broader Output channel distribution within the primary arbitration queue, head-of-line blocking problems are minimized.

BRIEF DESCRIPTION OF THE DRAWINGS

FIG. 9 is an example matrix of requests from switch input channels 0 through 3 at packet priority levels 0 through 3.

FIG. 10A is an example of the level 1 mask generation for the requests at level 1 in FIG. 9.

FIG. 10B is an example of the level 2 mask generation for the requests at level 2 in FIG. 9.

FIG. 10C is an example of the level 3 mask generation for the requests at level 3 in FIG. 9.

FIG. 11A is an example of the mask compare process for a request shown in FIG. 9.

FIG. 11B is an example of the mask compare process for a request shown in FIG. 9.

FIG. 12 is an example of the level-specific sub-scheduling process for the requests related to FIGS. 9 and 11B.

DETAILED DESCRIPTION

Figure 1:
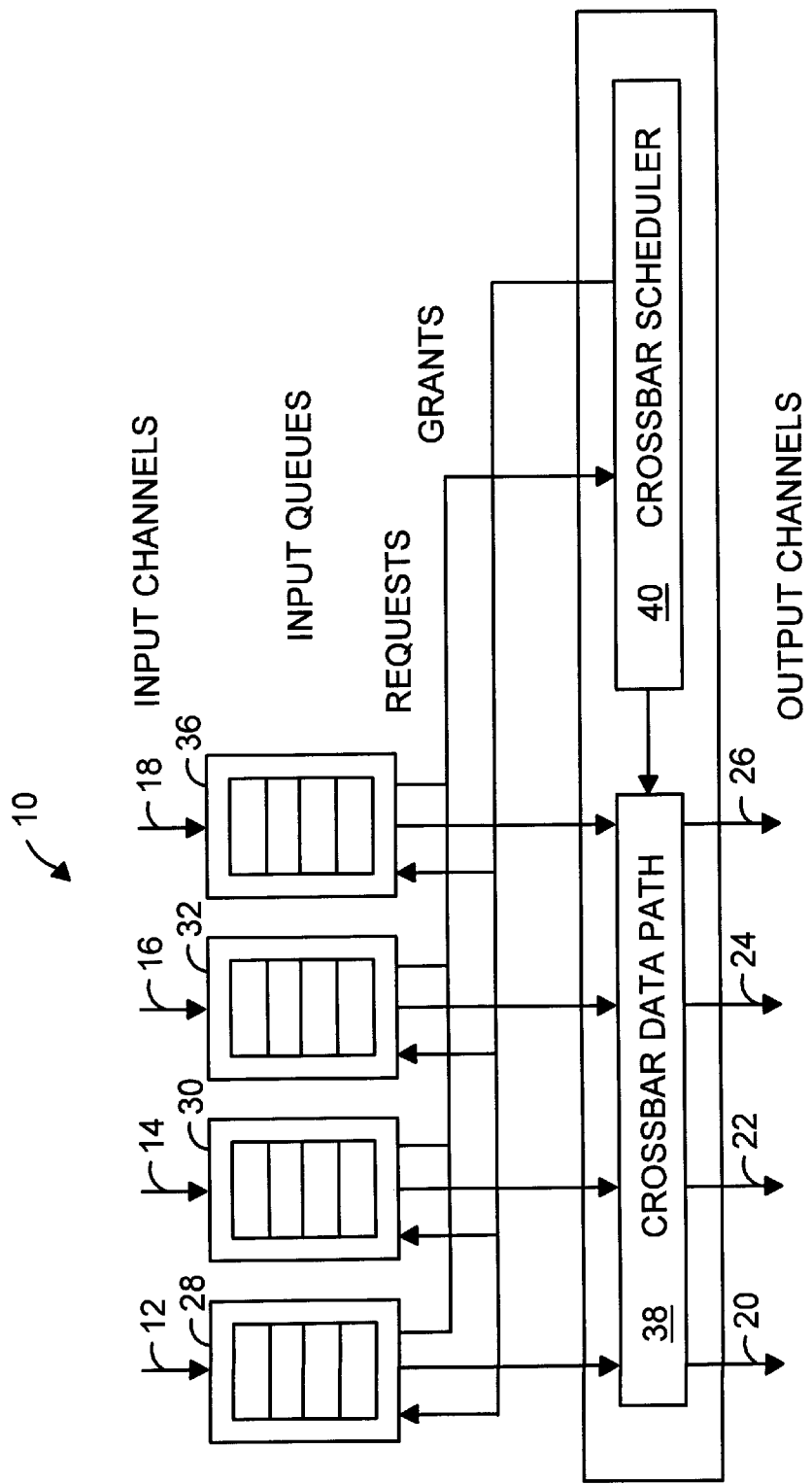
FIG. 1 is a diagram of a prior art switch that has four input channels and four output channels.
Figure 2:
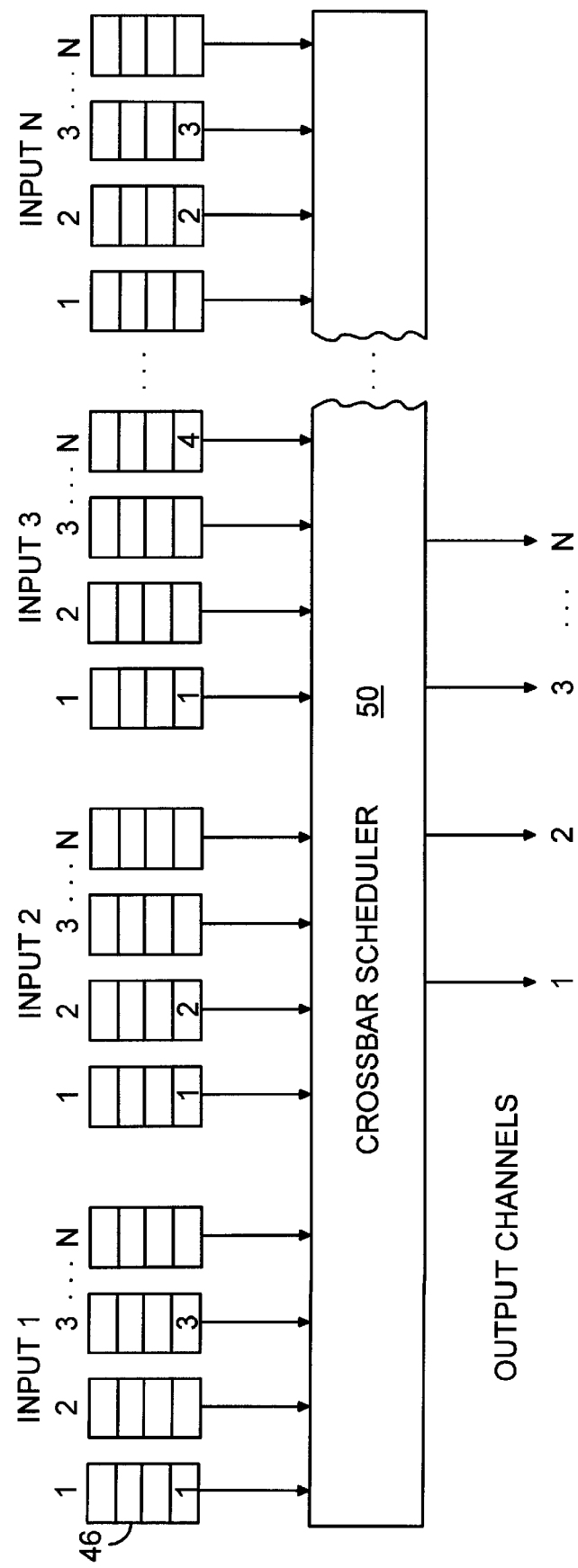
FIG. 2 is an N input channel by N output channel switch with $N^2$ output-distributed input queues.
Figure 3:
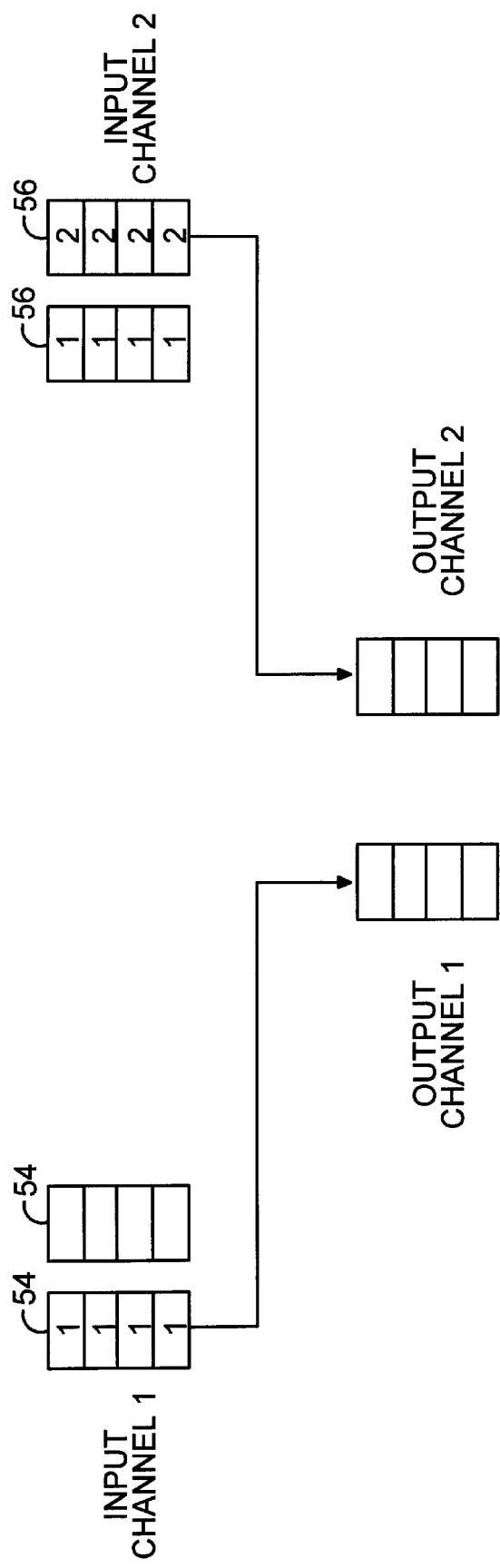
FIG. 3 is a depiction of the transferring of cells from output-distributed input queues to output channels where maximum matching between input and output channels is achieved using prior art techniques.
Figure 4:
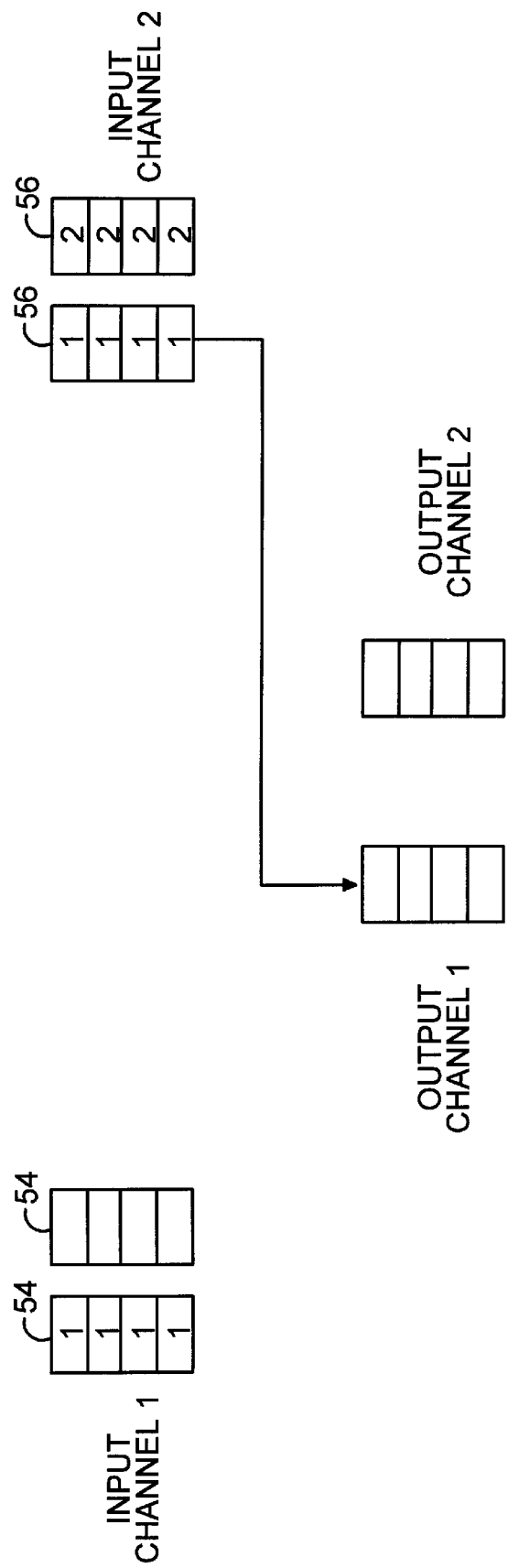
FIG. 4 is a depiction of the transferring of cells from output-distributed input queues to output channels where maximum matching between input and output channels is not achieved using the prior art techniques.
Figure 5:
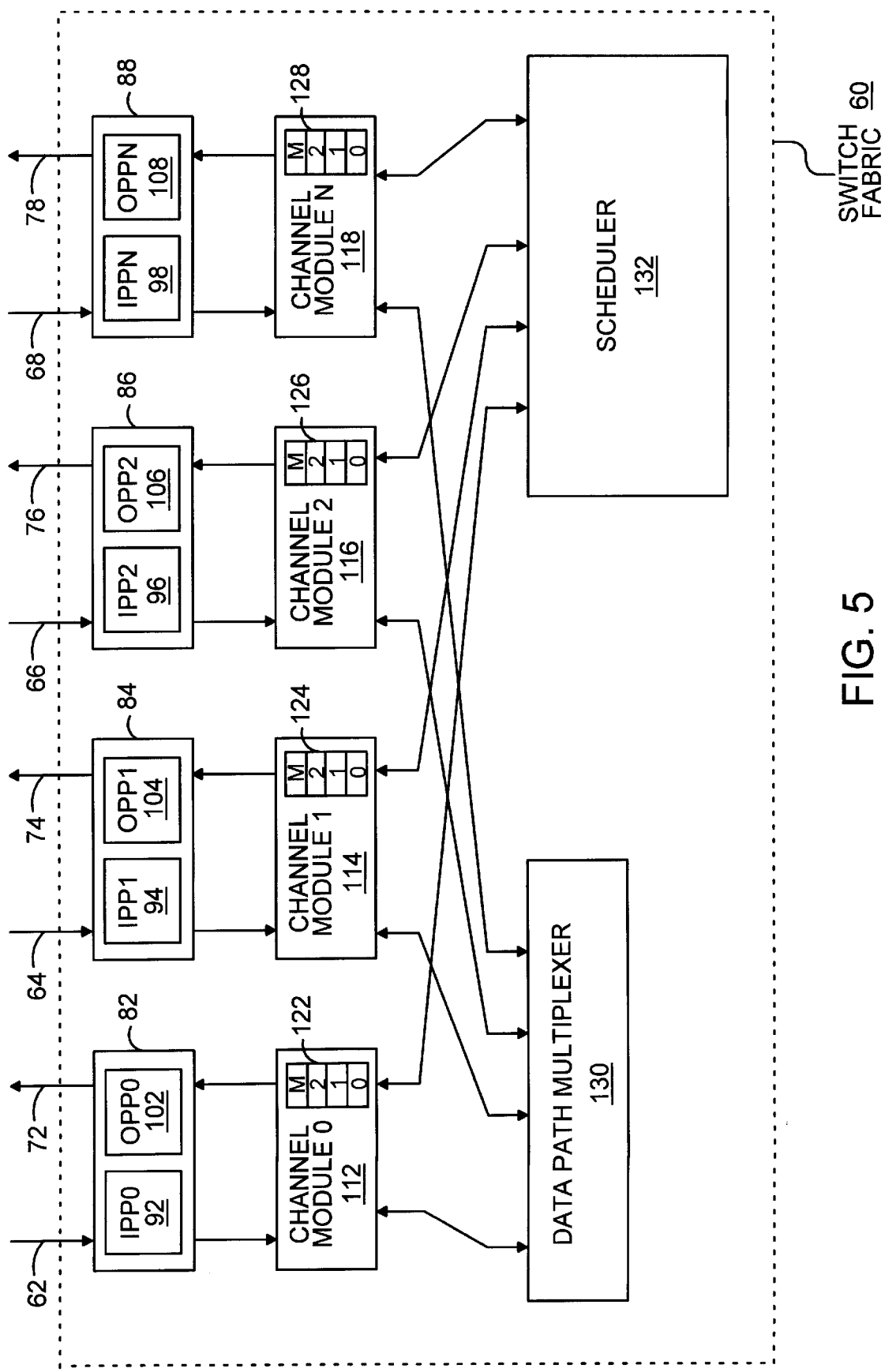
FIG. 5 is a diagram of the switch fabric architecture in accordance with the present invention.

FIG. 5 is a diagram of a preferred embodiment of a switch that is to be utilized in conjunction with the invention. For diagram purposes a 4×4 version of an N×N multiport switch fabric 60 is depicted, although a 16×16 switch fabric is preferred. In the preferred embodiment, the input channels 62, 64, 66 and 68 and output channels 72, 74, 76 and 78 are combined into packet processing units 82, 84, 86 and 88 that include input packet processors (IPPs) 92, 94, 96 and 98, and output packet processors (OPPs) 102, 104, 106 and 108. The IPPs segment incoming variable-sized packets into fixed-length switching cells and may buffer the cells before they are switched. Packets arriving at the IPPs can range in size, and may reach a size of thousands of bytes. The IPPs segment the packets into 36-byte fixed-length switching cells.

Figure 6:
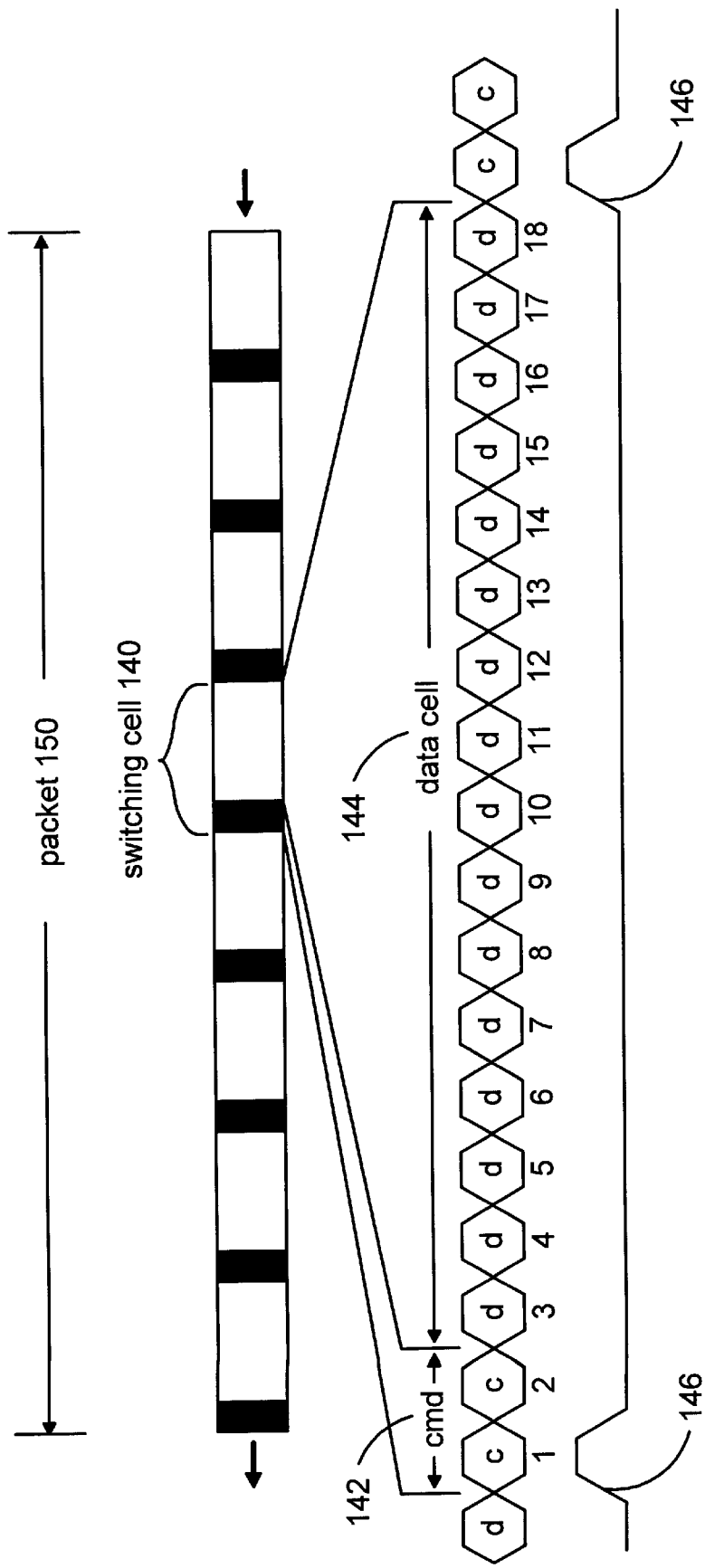
FIG. 6 is a diagram of a data packet and an expanded switching cell that is transmitted through the switch fabric of FIG. 5.

Referring to FIG. 6, each 36-byte switching cell 140 consists of a 4-byte command cell 142 and a 32-byte data cell 144. Using 16-bit channels, each switching cell is sent through the switch over eighteen clocks and a framing pulse 146 is used to indicate the termination of one switching cell and the beginning of an adjacent switching cell. Each command cell consists of two command fields. The first command field contains a request or response that is used to exchange messages related to switching arbitration. The second command field contains a data identifier that carries information relating to the data cell in the current switching cell. The data cell carries the data that is a part of a larger packet 150 from which the switching cell was segmented. After the switching cells pass through the data path multiplexer, the data cell portions of the switching cells are reassembled into variable-length packets by the OPPs for transmission within the network.

Referring back to FIG. 5, switching cells are transmitted between the IPPs/OPPs 92–98 and 102–108 and the corresponding channel modules 112, 114, 116 and 118. The channel modules execute a synchronization protocol for each channel, perform a cyclic redundancy check (CRC) for incoming requests, and generate a CRC for outgoing acknowledge messages. The channel modules are also responsible for routing the command and data cells to the proper locations within the switch. For efficiency purposes, the command cells that are transmitted between the channel modules and the IPPs/OPPs may be piggybacked onto data cells to form complete 36-byte switching cells, even though some of the information in the command cells may not be directly related to the data in the data cells they are traveling with. The channel modules demultiplex the command cells from the data cells and write the request portions of the command cells to a request buffer.

Figure 7:
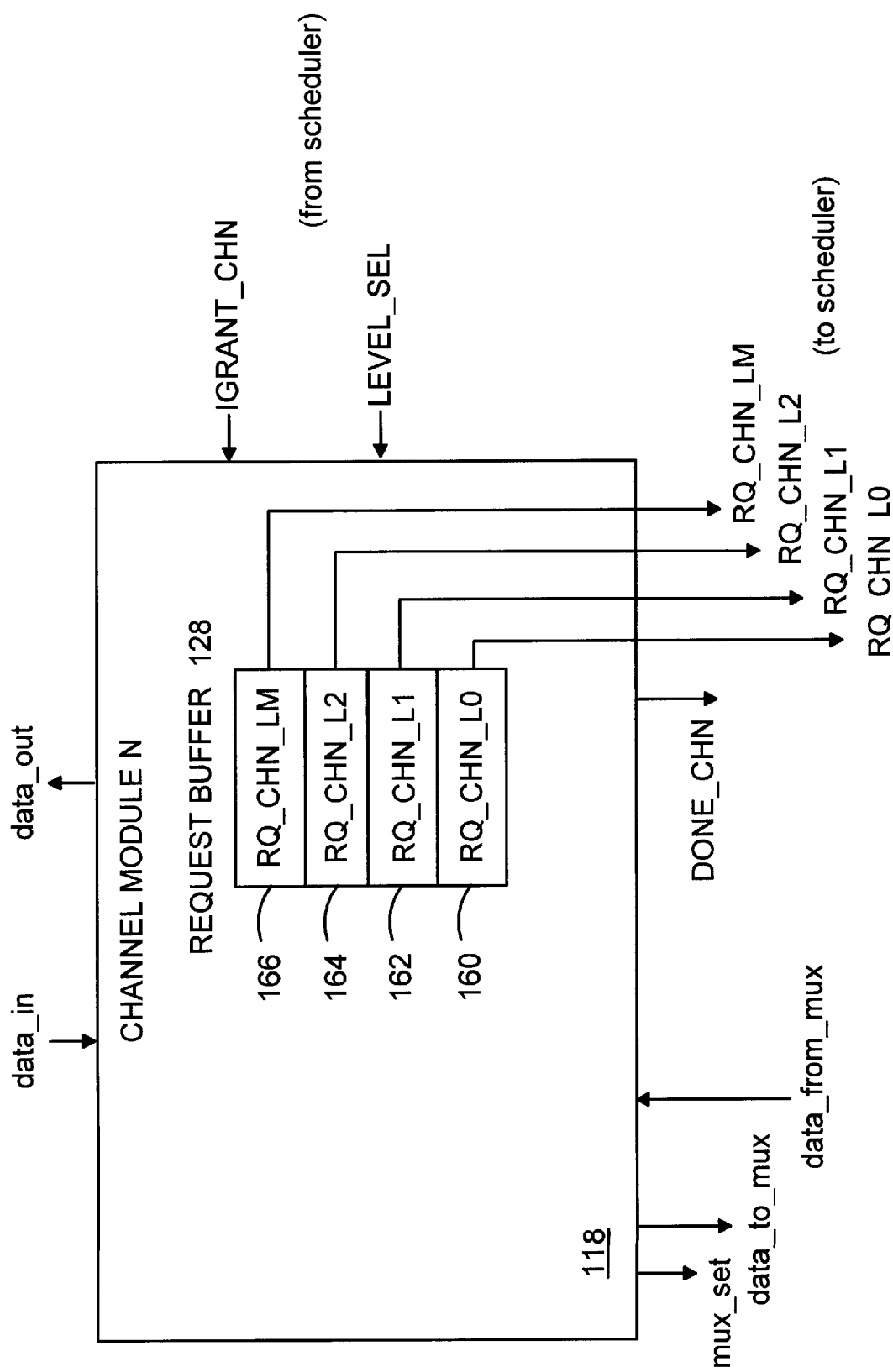
FIG. 7 is an expanded diagram of a channel module as shown in FIG. 5.

FIG. 7 is an expanded diagram of an example channel module N 118. The channel module of FIG. 7 has a request buffer 128 that can store M requests 160, 162, 164, 166 in M request registers and that can provide M requests to a scheduler in parallel. In the preferred 16×16 switch, M is equal to 4. That is, there can be up to four requests stored in each of sixteen request buffers for a total of sixty-four requests. With one buffer per channel and four request registers per buffer, a 16×16 switch has only sixteen buffers and provides only sixty-four requests to a scheduler per arbitration cycle, in comparison to a conventional 16×16 switch with output-distributed queues which would require $N^2$, or 256, request buffers and would provide $N^2$, or 256, requests to a scheduler per arbitration cycle.

The request buffers 122–128 of FIG. 5 and 7 are filled from the IPPs 92–98 in different manners, depending on what packet priority scheme is being implemented in the switch. If the packet priority scheme within the channel module request buffer is based upon time, where the oldest request has the highest packet priority, then the channel module request buffer is filled on a FIFO basis. In FIG. 7, the request buffer 128 for channel N has four request register designations 160, 162, 164 and 166 from bottom to top, level 0 (L0), level 1 (L1), level 2 (L2), and level M (LM), where register L0 is the highest priority and register LM is the lowest priority. In this packet priority scheme, register L0 contains the oldest request and register LM contains the newest request. Whenever a grant is issued in response to a request, the request buffer adjusts on a FIFO basis, thereby leaving a vacant request register at the lowest priority, LM. The vacant request register 166 is then available to receive a new request from the IPP 98.

On the other hand, the packet priority scheme may be based upon a factor other than time. For example, the packet priority scheme may be based upon the source of the data or the type of data. Under such a packet priority scheme, the four registers 160–166 in the request buffer 128 can be identified, for example, as control, high, medium, and low priority, with control being the highest packet priority (i.e., L0) and low being the lowest packet priority (i.e., LM). When a request is granted under this scheme, the vacant request register is resupplied with a request having the same packet priority level as the request for which a grant was just issued.

In an embodiment of the switch that is the focus of the present invention, the IPPs/OPPs function as part of an input/output control system to supply the vacant request registers with new requests in a priority scheme that increases the probability that all of the channels in the switch fabric will be utilized during a given arbitration cycle. The supplying of new requests to the request buffers will be discussed in detail with reference to FIGS. 17–26, after the description of the primary scheduling architecture and algorithms.

FIG. 7 also depicts the specific input and output links associated with each channel module, using channel N as an example. The data_in and data_out links located at the top of the channel module 118 are used to transport command cells, data cells, grants and level selects between the channel module and the IPP/OPP. The input grant link (IGRANT_CHN) and level select link (LEVEL_SEL) located at the right side of the channel module are used to transport the IGRANT_CHN signal and LEVEL_SEL signal from the scheduler to the channel module. The IGRANT_CHN signal represents an input grant that has been issued by the scheduler for channel N. The LEVEL_SEL signal represents the packet priority level that corresponds to the IGRANT_CHN signal. For example, the LEVEL_SEL signal will identify one of the levels L0 through LM corresponding to a CHN grant.

The channel N request links level 0 through level M (RQ_CHN_L0 through RQ_CHN_LM) and the done link (DONE_CHN) located at the bottom right of the channel module 118 are used to transport the channel requests and a done signal to the scheduler. The M request links are routed to the scheduler in parallel and provide the M requests to the scheduler simultaneously. As will be discussed further, providing parallel delivery of M requests helps to minimize the HOL blocking problem discussed above. The request links in the preferred 16×16 switch are 16-bit channels that carry requests that include a 16-bit crossbar exit channel descriptor (CEP). The 16-bit CEP has one bit associated with each output channel, and the desired output channels are identified by setting the bits that correspond to the output channels.

The DONE_CHN signal indicates to the scheduler when the input channel has completed transmitting the current group of switching cells. Switching cells that are segmented from the same packet are ideally transmitted one after another. Since packets are variable length and are therefore made up of a variable number of switching cells, it is preferred that the scheduler be informed when an input channel has completed transferring of a group of switching cells. The DONE_CHN signal is also used to determine which output channels have become available to receive switching cells. Determining available output channels from a DONE_CHN signal that indicates the availability of an input channel is accomplished through a look-up table. A look-up table is updated each time a grant is issued to an input channel. The look-up table identifies which output channels will be utilized by the input channel for the granted cell transfer. When a DONE_CHN signal is received by the scheduler, the look-up table for the corresponding input channel is accessed and the identified output channels in the look-up table are released and made available for future switching.

The data to and from the multiplexer links (data to mux and data_from_mux) and the multiplexer setup link (mux set) located at the bottom left of the channel module 118 are used to transfer data cells to and from the multiplexer and to set up the data paths within the multiplexer for the transfer of switching cells.

Although not represented, the channel module 118 also performs a time-out function to limit the amount of time and therefore the number of cells that can be transferred uninterrupted by a single input/output channel combination. Every time a grant is issued to an input channel, a timeout counter in the corresponding channel module is set to the timeout value. During every successive clock cycle, the timeout counter is decremented and if the input channel cannot complete the transfer within the timeout period, the timeout counter expires and the transfer is terminated. In the preferred embodiment, the timeout counters in the channel modules are set to allow up to 4,096-byte packets to be switched in one uninterrupted event.

Referring back to FIG. 5, the channel modules 112–118 are connected to a data path multiplexer 130 that provides the physical paths for data cell switching between channels. The preferred data path multiplexer has the ability to unicast data cells and to multicast data cells. In the preferred embodiment, the data path multiplexer is a multiport switch, although in another embodiment the data path multiplexer can be a crossbar switch. The type of data path multiplexer is not critical to the invention.

The channel modules 112–118 are also connected to a scheduler 132. The scheduler utilizes the requests from the channel modules to manage the cell traffic through the data path multiplexer in a manner that maximizes the throughput of switching cells without unfairly delaying lower priority data.

Figure 8:
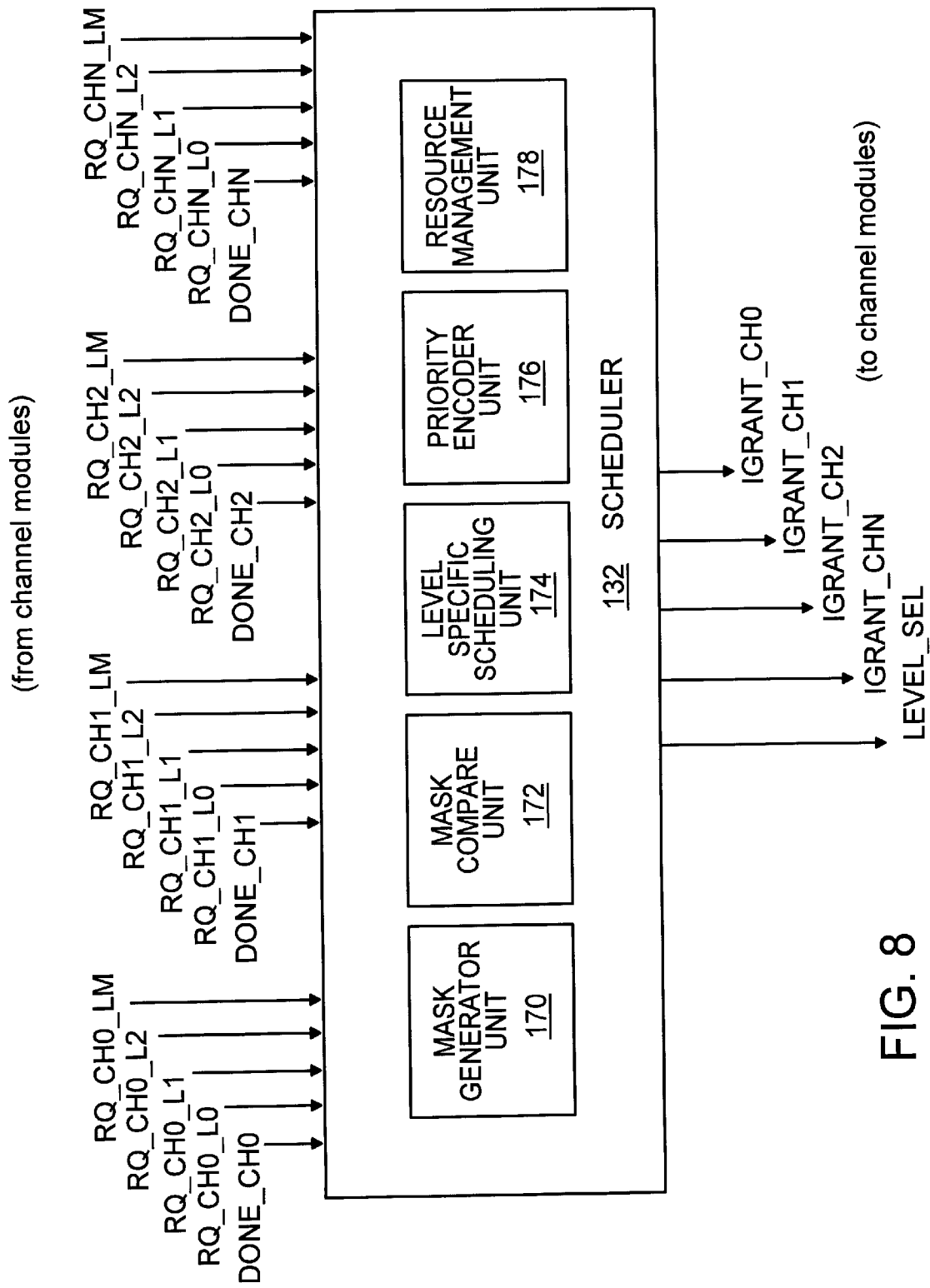
FIG. 8 is an expanded diagram of the scheduler as shown in FIG. 5.

FIG. 8 is an expanded view of the scheduler 132. The scheduler is first described in terms of the input and output links and then in terms of the functional blocks within the scheduler that operate to generate the output signals. Located along the top of the scheduler, request links and done signal links are connected to the scheduler for receiving requests and done signals from the channel modules as depicted in FIG. 7. Each channel has M parallel request links between the channel modules and the scheduler and in the preferred embodiment there are four parallel request links per channel. The highest packet priority request link is identified as, for example, RQ_CH0_L0, where "RQ" is short for request, "CH0" is short for channel 0, and "L0" is short for packet priority level 0. As described above, each request link consists of 16-bit channels where a 16-bit field is delivered to the scheduler in a single clock. The DONE_CH0 signal is received from the channel module and indicates when an input is available and what corresponding outputs are available.

The output links located along the bottom of the scheduler include a grant link for each channel and a level select link. As described with reference to the channel modules, the grant links transmit the IGRANT_CHN signals generated within the scheduler to the channel modules to indicate that a request from a particular channel has been granted. The LEVEL_SEL link transmits a LEVEL_SEL signal to the channel module along with each grant to indicate the packet priority level of the granted request. For example, if a request is granted to channel N, the LEVEL_SEL signal indicates to channel module N the particular packet priority level of the request.

The functional blocks within the scheduler depicted in FIG. 8 include a mask generator unit 170, a mask compare unit 172, a level-specific scheduling unit 174, a priority encoder unit 176, and a resource management unit 178. The mask generator unit is a circuit that generates packet priority level-specific masks that are utilized in the arbitration process to indicate which output channels will be utilized by the input channels for a specific packet priority level. In the preferred 16–16 switch, a level-specific mask consists of a 16-bit vector where each bit is dedicated to one of the output channels. A level-specific mask is generated by combining all of the request vectors from the request channels 0–15 for the same packet priority level to form a single mask vector that represents all of the requests.

In an example related to the NxN switch of FIG. 5, masks are generated from the requests of input channels 0–3, CH0–CH3, having packet priority levels 1 through 3, L1–L3. The channels 0–3 are the input channels 62–68, respectively. For example purposes, FIG. 9 represents the requests from channels CH0–CH3 at packet priority levels L0–L3. FIGS. 10A–10C represent the mask generation for the L1_MASK, the L2_MASK and the L3_MASK. The L1_MASK is generated from the aggregate of the requests for channels CH0 through CH3 at packet priority level L0. The mask, represented in FIG. 10A as L1_MASK, has a bit set to "1" at any place where an L0 request for any channel was set to "1." The end result is that the mask represents all outputs that are requested by the stored requests that are designated as having the highest packet priority levels. As depicted in FIGS. 10B and 10C, the L2 and L3 masks are generated by building on the lower level masks in the same manner. The highest packet priority level mask, L0_MASK (not shown), is generated by simply copying the highest packet priority request that is related to the channel with the highest round-robin priority designation. Round-robin priority refers to a priority scheme among channels that is used in the arbitration process and will be discussed further below. Preferably, all of the masks are regenerated once before each eighteen clock arbitration cycle, but the masks can be regenerated every clock, if desired. The algorithms for creating four masks for an NXN switch are as follows:

L0_MASK=RQ_CHX_L0, where CHX is the channel with the "high priority" designation

L1_MASK=(RQ_CH0_L0)|(RQ_CH1_L0)| . . . (RQ_CHN_L0)

L2_MASK=L1_MASK|(RQ_CH0_L1)|(RQ_CH0_L$_1$)| . . . (RQ_CHN_L1)

L3_MASK=L2_MASK|(RQ_CH0_L2)|(RQ_CH1_L2)| . . . (RQ_CHN_L2)

In the operation of the L1, L2, and L3 masks, requests from input channels which are unavailable are not included in the mask generation algorithm.

The next functional block in FIG. 8 is the mask compare unit 172. The mask compare unit is a circuit that compares level-specific masks to the availability of the input channels and to the requests from the corresponding priority level, while monitoring for conflicts between available inputs, requested outputs, and the mask. The availability of inputs is represented by an input vector (IVEC) that is an N bit vector where N equals the number of input channels in the switch. In the 4x4 switch example, the IVEC is a 4-bit vector with unavailable input channels having a corresponding bit set to "1." Referring to FIGS. 11A and 11B, examples of the mask compare process are depicted. In the example of FIG. 11A, the request used, RQ_CH1_L1, is taken from FIG. 9 and includes the 4-bit request vector "0010." The input vector, IVEC, is exemplary and is the 4-bit vector "0100," representing that input channel 1 is unavailable or busy. Since the unavailable input channel is the same as the input channel making the request, the request cannot be granted to the busy channel and all request bits are set to "0." The resulting request is compared to the L1_MASK, which represents the higher priority output channel requests from L0. Since the resulting RQ_CH1_L1 is the 4-bit vector "0000," a request for zero output channels is passed on to the level-specific scheduling unit.

In the example of FIG. 11B, request RQ_CH2_L1 is taken from FIG. 9 and is the 4-bit request vector "0010." The input vector is exemplary and is the same 4-bit vector "0100" as used in the previous example. Since the input vector indicates that only input channel 1 is unavailable and the request is from input channel 2, the resulting request vector remains "0010." The L1_MASK vector is again "1001" which represents that output channels 0 and 3 have been or will be requested by higher priority requests for output channels. The L1_MASK does not conflict with the request and as a result, the scheduler will pass on RQ_CH2_L1 as the vector "0010."

Referring back to FIG. 8, the next functional block is the level-specific scheduling unit 174. The level-specific scheduling unit is a circuit that contains a level-specific sub-scheduler for each packet priority level. In the preferred embodiment of the 16×16 switch, there are four packet priority levels and therefore four level-specific sub-schedulers. The level-specific sub-schedulers receive the level-specific requests that are output from the mask compare unit 172 and compare input and output vectors to the requesting channel and to the request vector to determine if channel conflicts exist.

If no channel conflicts exist between the input vector, output vector, requesting channel, and request vector, a grant is issued and the input and output vectors are set to reflect the new grant.

The level-specific sub-scheduling units utilize a round-robin arbitration scheme to guarantee fairness among requests of the same priority level. Under the round-robin scheme, initially, channel 0 is designated as having the highest round-robin channel priority and channel 15 is designated as having the lowest round-robin priority. Note that round-robin priority is relevant to the channel priority order inside the level-specific sub-schedulers and is different from the packet priority, which is relevant to the order in which requests are presented from channel modules. Inside the level-specific sub-schedulers, requests are processed between channels in round-robin priority order such that requests from channels with higher round-robin priority are granted access to output channels whenever there is contention with requests from channels with lower round-robin priority. Once the channel with the highest round-robin priority receives a grant, the highest round-robin priority designation is rotated to the next input channel with a pending request. Under the rotating round-robin channel priority approach, every channel will periodically be designated as the highest priority.

High round-robin priority designation plays an especially important role in allowing multicast transmissions through a switch. Multicast requests are difficult to schedule in high-traffic environments, because the likelihood that all output channels are available is low. To guarantee bounded latency for multicast and broadcast traffic, when a channel is designated as the highest round-robin priority, any output channels requested by the channel will be reserved by the scheduler, unless the output channels are required by requests from other channels with higher packet priority until all of the output channels required to grant the request become available.

An example of the level-specific sub-scheduling process is depicted in FIG. 12 for one packet priority level. For the example, assume that channel 2 has the highest round-robin priority. The example is a continuation of the example of FIG. 11B. In FIG. 12, the input vector is still "0100," the exemplary output vector is "0001," and the request RQ_CH2_L1 is "0010." The input vector indicates that input channel 1 is busy and the output vector indicates that output channel 3 is busy. The request RQ_CH2_L1 is for input channel 2 to transmit a cell to output channel 2, neither of which conflicts with the input vector or output vector. Since no conflicts exist between the request, the requesting channel, the input vector, and the output vector, a grant with vector "0010" is issued for CH2_L1. Along with the grant, the level-specific sub-scheduling unit also generates updated input and output vectors that represent the IVEC and the OVEC that will be utilized if the request is granted. The updated input vector and output vector are identified as IVEC_NEXT_L1 and OVEC_NEXT_L1. In the example, IVEC will change from "0100" to "0110" to signify that input channel 2 will also be busy and OVEC will change from "0001" to "0011" to indicate that output channel 2 will also be busy.

Referring back to FIG. 8, the next functional block is the priority encoder unit 176. The priority encoder unit is a circuit that is responsible for implementing the packet priority order and issuing the final grants to the channel modules. When there are one or more possible grants transmitted to the priority encoder unit from the four level-specific sub-schedulers in the current scheduling cycle, the priority encoder unit picks the grant corresponding to the request with the highest packet priority and passes the grant on to the requesting channel module. The priority encoder unit also sends the updated values of the input and output channel utilization to the resource management unit to update IVEC and OVEC.

Referring back to FIG. 8, the resource management unit 178 is responsible for maintaining the status of the input and output vectors IVEC and OVEC, respectively. Every time a grant is issued, the input vector bit related to the input channel that received the grant and the output vector bit related to the output channels that are going to be used in the packet transfer are marked as busy. When the end of a packet transfer is signaled by the channel module using a done signal, the respective input vector bits and output vector bits marked during the transfer are cleared so that the channels can be scheduled for another transfer.

Figure 13:
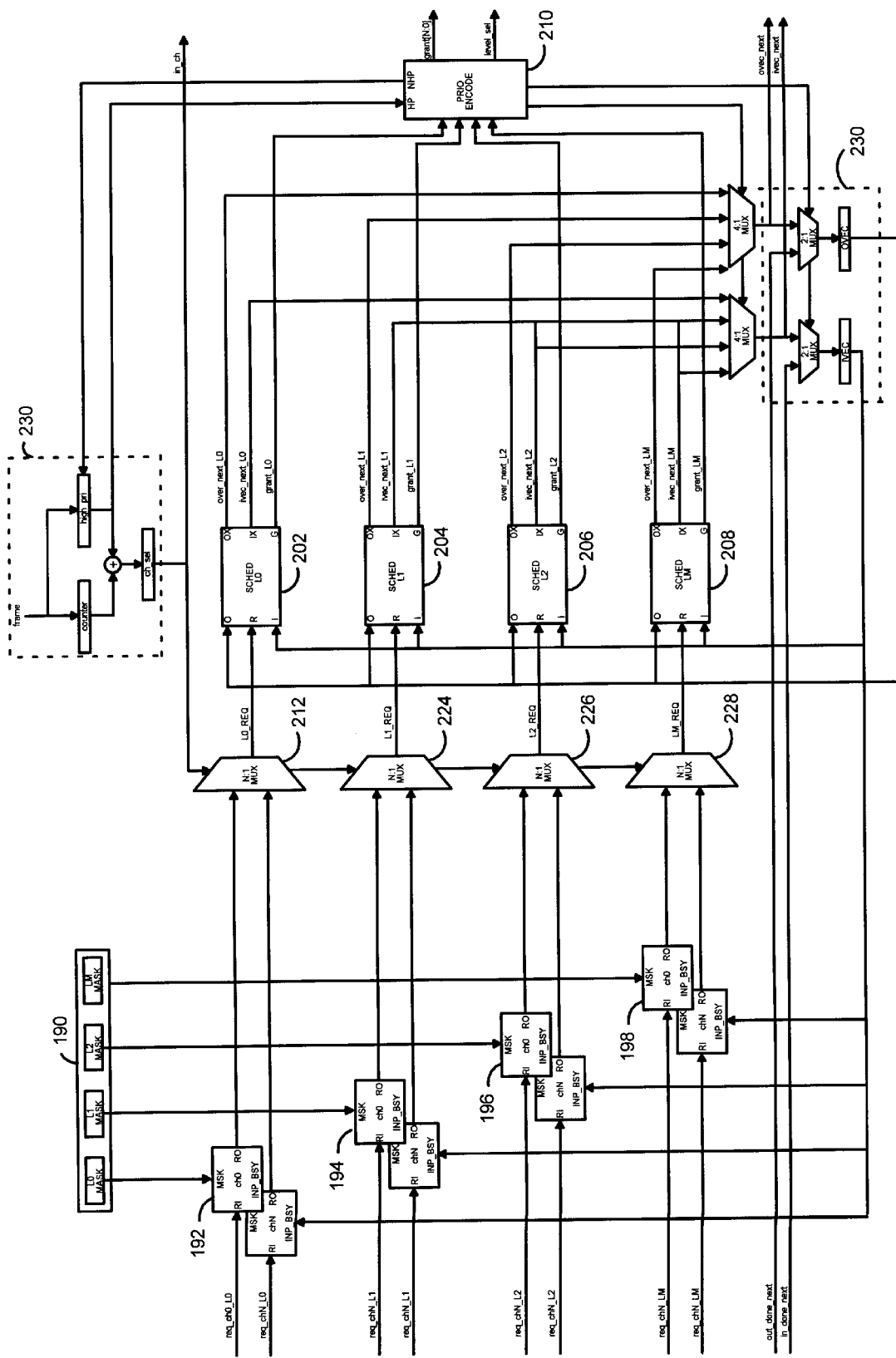
FIG. 13 is a diagram of the preferred N-channel multi-priority scheduler architecture for the scheduler shown in FIGS. 5 and 6.

FIG. 13 is a diagram of the preferred N-channel multi-priority scheduler architecture that includes the mask generator unit 190, mask compare sub-units 192, 194, 196 and 198, the level-specific sub-scheduling units 202, 204, 206 and 208, the priority encoder unit 210, and the resource management unit 230. The preferred architecture reflects a scheduler where M, the number of packet priority levels and request buffer registers per channel, is equal to 4. Following a logical flow, a request, for example, RQ_CH0_L0 enters a mask compare sub-unit 192 at the request input (R1). The level 0 mask enters the mask compare sub-unit at MSK and an input vector, IVEC, enters at INP_BSY. The vectors are compared as described above, and a request is output from the request output (R0) to an N:1 multiplexer 212. The N:1 multiplexer designates the request as high priority where applicable and forwards the request to a sub-scheduling unit 202 of the level-specific scheduling unit for L0. The input vector, IVEC, and an output vector, OVEC, are input into the level-specific sub-scheduling unit from the resource management unit along with the request for channel 0 at level 0, RQ_CH0_L0 from the mask compare sub-unit.

A grant is issued from the level-specific sub-scheduling units 202–208 based on the availability of input channels and output channels and the round-robin priority as described above. The updated input and output vectors are sent to respective multiplexers as IVEC_NEXT_L0 and OVEC_NEXT_L0, while the grant is sent to the priority encoder unit as IGRANT_L0.

The priority encoder unit 210 receives four grants from the four level-specific sub-scheduling units 202–208 for each channel. A single grant for a single channel is issued by the priority encoder unit based on packet priority level. That is, the grant with the highest packet priority level is selected among the four available grants and, therefore, if there is a grant for an output channel from level 0, it has priority over all other packet priority levels for the channel. Similarly, if there are no grants for packet priority levels L0 and L1, but there are grants for packet priority levels L2 and L3, then the L2 grant is issued and the L3 grant must wait for a later arbitration cycle.

If a grant is issued to the high priority channel, then the high priority designation is shifted to the next channel. The preferred channel priority architecture 230 is depicted in FIG. 13. After being processed through the priority encoder unit, the grant issued based on packet priority level is transmitted to the corresponding channel module accompanied by a level select signal that identifies which packet priority level the request relates to and where in the request buffer the request is located.

Although the functions of the overall scheduler unit have been specifically described, it is important to note that the functions may be performed in different orders. For example, it is possible to perform the level-specific sub-scheduling function before the mask compare function. In addition, the process of accounting for input and output channel availability as performed by the resource management unit may differ. Further, the physical boundaries may vary from those described. For example, certain functions such as mask generation may be performed outside the physical boundaries of the scheduler.

Figure 14:
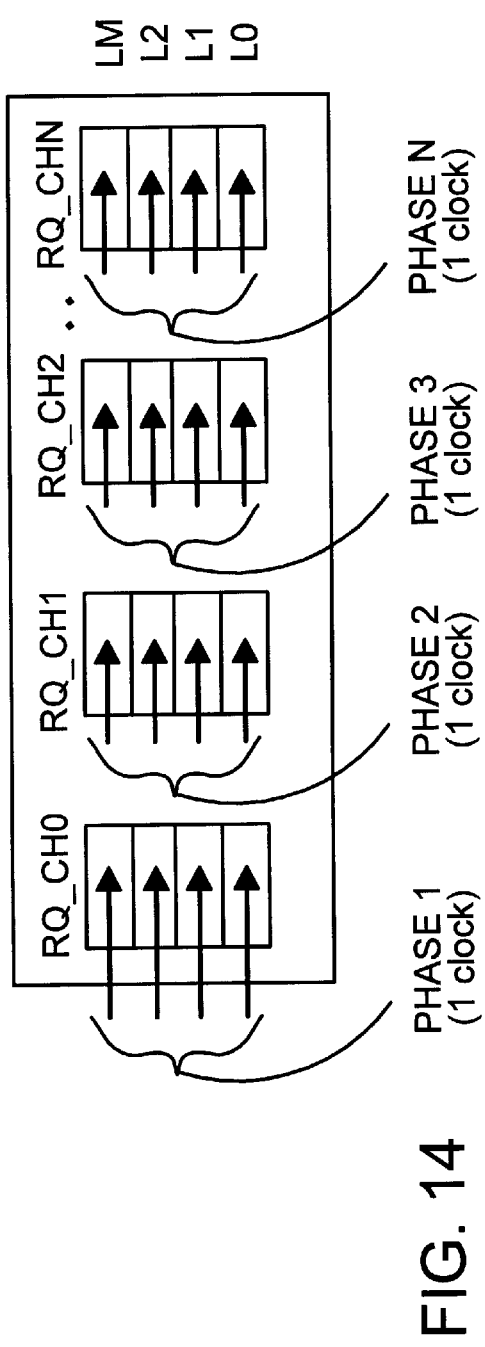
FIG. 14 is a depiction of the preferred multi-level in-parallel arbitration process for an N×N switch with M packet priority levels in accordance with the invention.

The preferred arbitration method is further explained with reference to FIG. 14, which graphically represents buffered requests from an N-channel multiport switch. The channel modules have the ability to buffer M requests in their respective buffers with a packet priority designation that ranges from a highest packet priority at level 0, L0, to a lowest packet priority at level M, LM. In the preferred embodiment, N is 16, indicating sixteen channels CH0–CH15 and M is 4, indicating four request storage registers and four corresponding packet priority levels L0–L3 related to each channel for a total of 4×16=64 request buffer registers.

In the preferred arbitration method, packet priority refers to the priority level of one buffered request for a channel versus another buffered request for the same channel. Time is used as the packet priority basis in this embodiment and under the time approach L0 contains the oldest request in the buffer and has the highest packet priority. Levels 1, 2, and 3 contain sequentially newer requests and have sequentially lower packet priority. Round-robin priority refers to the channel that is designated as high round-robin priority under the rotating round-robin channel priority scheme. As described above, once a channel is designated as high round-robin priority, the channel maintains the designation for successive arbitration cycles until a grant is issued for the channel. Round-robin priority after the high priority channel is distributed sequentially (i.e., from channel 0 to 15 and then back to channel 0) such that each sequential channel has a lower round-robin priority. For example, if CH13 is the highest round-robin priority channel, CH14 is the next highest round-robin priority, CH15 is the next highest round-robin priority, and CH0 is the next highest round-robin priority, with the pattern continuing until CH12, which is the lowest round-robin priority channel.

Figure 15:
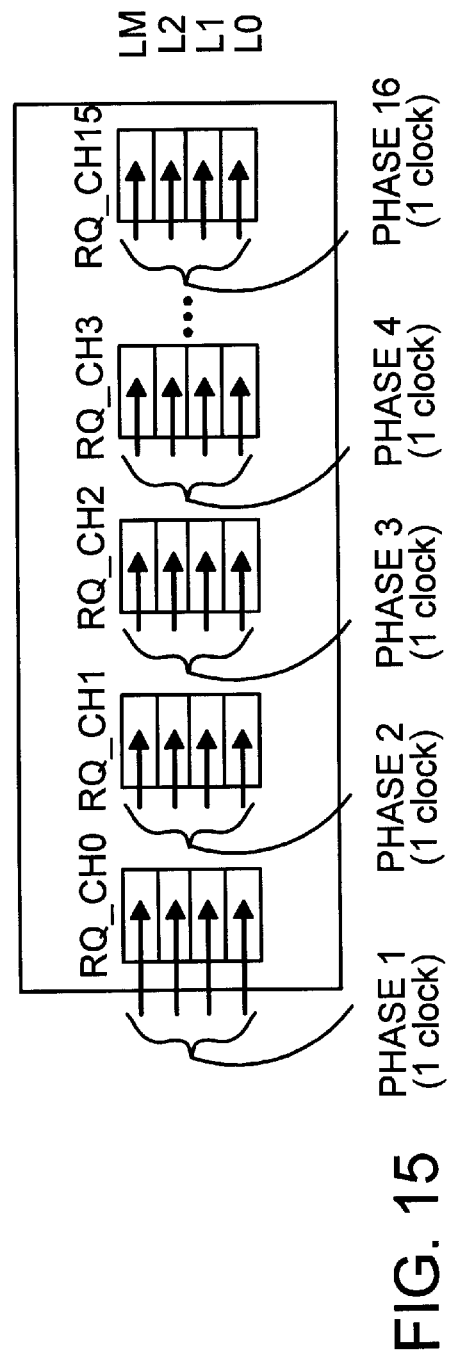
FIG. 15 is a depiction of the preferred multi-level in-parallel arbitration process for a 16x16 switch with four packet priority levels in accordance with the invention.

With the priority protocol established, the preferred multilevel in-parallel arbitration (MLIPA) process is described with reference to FIG. 15.

In the example, it is assumed that L0 is designated high packet priority and channel 0 has the highest round-robin priority. Therefore, in the first clock, phase 1, the four requests, L0–L3, for CH0 are arbitrated as described above. Simultaneously, the L0–L3 requests are processed through the mask compare unit, the level-specific scheduling unit, and the priority encoder unit.

Out of the parallel process, one request from one of the four packet priority levels will be granted. Remembering that CH0 is the highest priority channel, it is likely that the CH0_L0 request will receive the grant even if it is a multicast request that requires available output channels to be reserved while unavailable output channels become available.

In the next clock, phase 2, the four requests, L0–L3, for CH1 are arbitrated as described above. The arbitration of the four requests is performed in parallel and, if possible, one request is issued for the channel.

In the next clock, phase 3, the four requests, L0–L3, for CH2 are arbitrated as described above. As can be seen, the arbitration continues for sixteen clocks and at the end of sixteen clocks sixty-four requests have been arbitrated and grants have been issued in a manner that maximizes input channel and output channel utilization.

A complete arbitration cycle requires eighteen clocks, two clocks for arbitration preparation and sixteen clocks for arbitration. The sixteen clocks that are required to arbitrate the sixty-four requests are synchronized to the sixteen clocks that are required to transmit the data cell portion of a switching cell, as described with reference to FIG. 6. Before a new sixteen clock arbitration process begins, and during the two clocks required to transmit the command cell portion of the next switching cell, preparations are made for the next arbitration process. In the first clock, all of the done signals are reviewed and the channels that have become available during the preceding arbitration cycle are released by clearing the appropriate input vectors and output vectors. Additionally, in the first clock the request buffers are replenished to fill request registers vacated by the requests that were granted in the last arbitration cycle. In the second and last clock before the next arbitration begins, new masks, that reflect the newly replenished buffers, are generated for the four packet priority levels and the round-robin priority is rotated if the highest round-robin priority channel received a grant in the last arbitration cycle.

Figure 16:
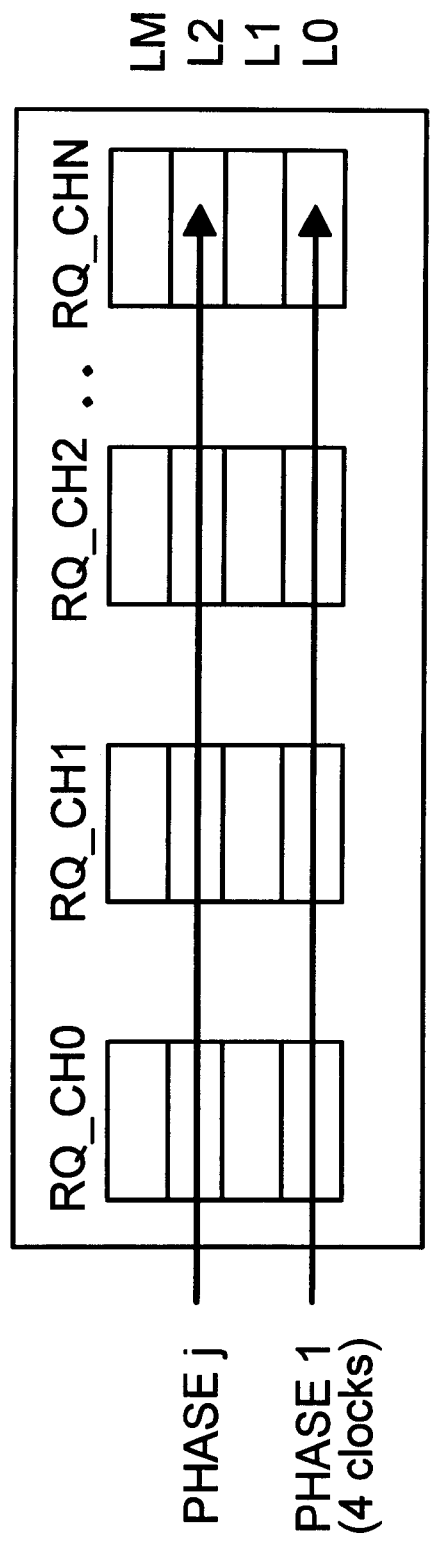
FIG. 16 is a diagram of an alternative single level, single channel arbitration process for an N×N switch with M packet priority levels in accordance with the invention.

In an alternative arbitration method, the requests in the request buffers can be arbitrated one request at a time, one packet priority level at a time, as depicted in FIG. 16. In the preferred embodiment where N=16 and M=4, the arbitration process would arbitrate sixty-four requests in sixty-four clocks. The arbitration would start at the highest round-robin priority and highest packet priority request, for example, RQ_CH0_L0. Phase 1 requires sixteen clocks, phase 2 requires sixteen clocks, phase 3 requires sixteen clocks, and phase 4 requires sixteen clocks for a total of sixty-four clocks. Grants are issued on a first request-first grant basis with the round-robin priority rotating each arbitration cycle as described above. An advantage of this approach is the simplicity found in the fact that mask generation, mask comparing, and parallel arbitration are not being performed. A disadvantage is that one arbitration cycle takes sixty-four clocks as opposed to eighteen clocks per cycle for the arbitration method described above.

As briefly cited above and in accordance with the present invention, the IPPs/OPPs function as part of an input/output control system to supply the vacant request registers in the channel module request buffers with new requests in a priority scheme that increases the probability that the maximum number of switch fabric output channels will be utilized during any given arbitration cycle. Specifically, the probability that a given output channel will be utilized is increased by configuring input/output (I/O) controllers to supply new requests to the scheduler that are requesting output channels that do not conflict with requests for output channels that are presently being held in the channel module request buffers. That is, the channel module request buffers are supplied with new requests that provide a more varied distribution of target output channels, so that the scheduler has more output channel options from which to choose during each arbitration cycle. This approach to supplying the channel module request buffers helps to remedy a head-of-line blocking problem that can occur when the first three requests in a channel module request buffer are held up by other higher priority packet transfers.

Figure 17:
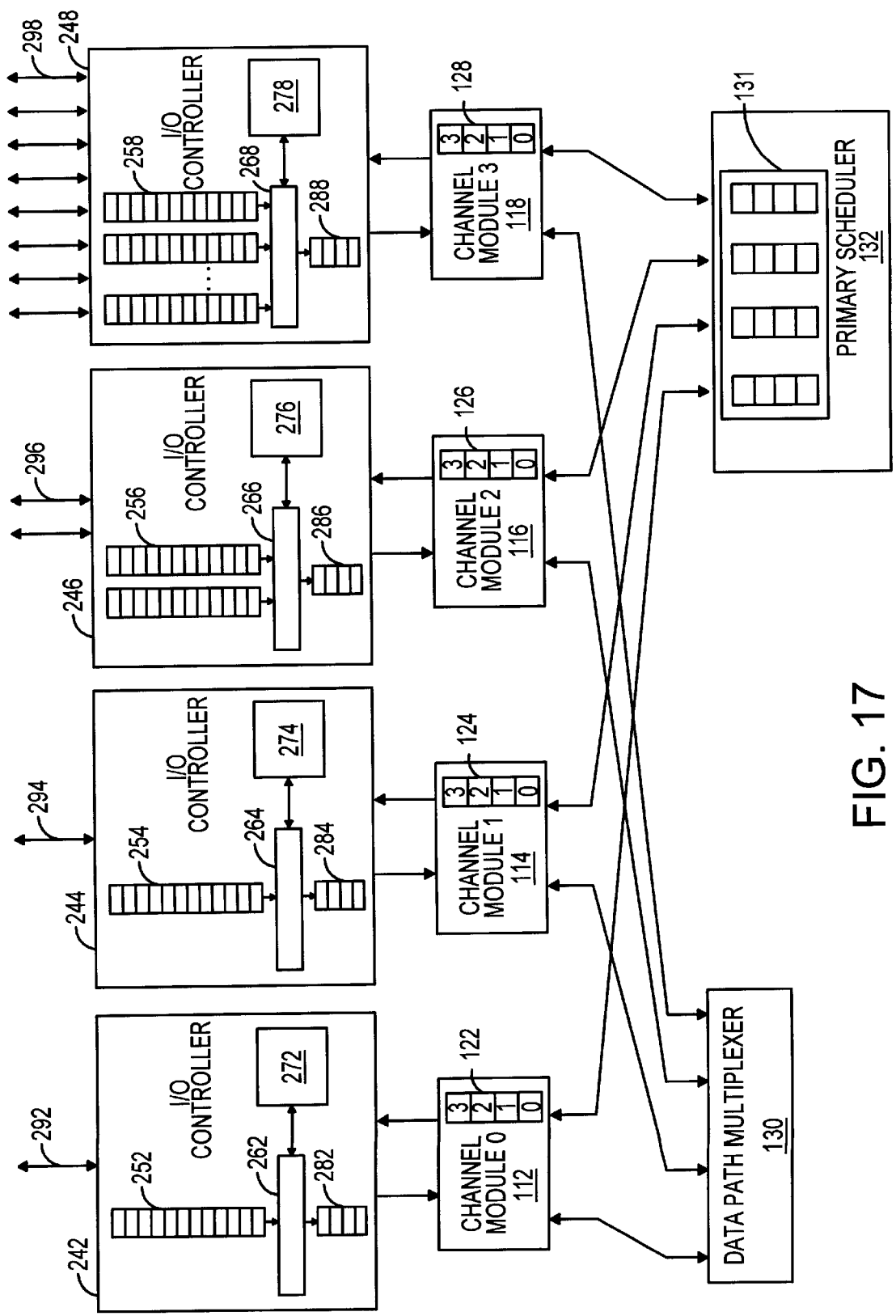
FIG. 17 is a depiction of a preferred architecture for supplying a scheduler with new requests in accordance with the invention.

FIG. 17 is a depiction of a preferred architecture for supplying the scheduler with new requests. FIG. 17 is similar to FIG. 5 except that, for description purposes, the IPPs 92–98 and OPPs 102–108 are incorporated into I/O controllers 242, 244, 246 and 248 and are not shown. It should be understood that the functions to be described can be partially performed within the IPPs/OPPs or the functions can be performed in additional circuitry and programming that make up the I/O controllers. As described above, the switch is depicted as having a four-channel switch fabric, but the switch fabric can have more or less than four channels. In addition, for description purposes, the I/O controllers are shown connected to one, two, or eight ports as opposed to the switch of FIG. 5 in which each channel is described in terms of a single port. In a preferred embodiment, the one- and two-port configurations represent 1000 megabits per second (Mbps) connections to the switch and the eight-port configuration represents 10 and/or 100 Mbps connections.

Within each I/O controller 242–248, the elements of importance to the preferred embodiment of the invention are a request queue or queues 252, 254, 256 and 258, queue managers 262, 264, 266 and 268, secondary schedulers 272, 274, 276 and 278, and copies of the requests that are accessible to the main scheduler (referred to as the primary arbitration queues). The main scheduler is referred to as the primary scheduler 132 in order to distinguish it from the secondary schedulers. Referring to FIG. 17, the primary arbitration queue for each channel is depicted in three places. The primary arbitration queue actually resides in the request buffers 122, 124, 126 and 128 of the channel modules 112–118, so that the requests are accessible to the primary scheduler. Copies 282, 284, 286 and 288 of the primary arbitration queue are also kept or utilized in the I/O controllers and a composite copy 131 is formed in the primary scheduler for arbitration purposes. In addition to the named elements of importance, the I/O controllers may include other devices and/or functions, such as port controllers and packet buffers that are not depicted.

The request queues 252–258 depicted within each I/O controller 242–248 relate on a one-to-one basis to the ports 292, 294, 296 and 298 that are connected to the I/O controller. For example, in the case of only one port, all requests from the one port are queued in a single request queue. Likewise, when eight ports are connected to the I/O controller, there are eight separate request queues that store requests related to the respective ports. In the preferred embodiment, the request queues are time-ordered queues. For description purposes, in all of the request queues, the oldest request is depicted at the bottom of the queue and the youngest request is depicted at the top of the queue, although this is not critical to the invention. The request queues within each I/O controller are shown to represent twelve requests stored in each queue, although the queues may store less and preferably store more than twelve requests per port.

The queue managers 262–268 within the I/O controllers manage the transfer of requests between the request queues 252–258 and the channel modules 112–118/primary scheduler 132. The queue managers also supply a copy of the primary arbitration queue to the secondary schedulers for secondary arbitration purposes. The queue managers are preferably located within the IPPs, although this not critical.

The secondary schedulers 272–278 are the units that arbitrate which requests, from the group of requests that are stored in the request queues 252–258, will be supplied to the primary arbitration queue when a new request is needed for the primary scheduler 132. Although all of the secondary schedulers operate in a similar manner, there are configuration differences between the secondary schedulers based on the numbers of ports connected to the I/O controller and the number of packet priorities that are supported within the switch. The secondary scheduling process is discussed in relation to the one-port, two-port, and eight-port cases and it will become apparent to one of ordinary skill in the art that similar approaches can be taken when different numbers of ports are connected to an I/O controller.

Figure 18:
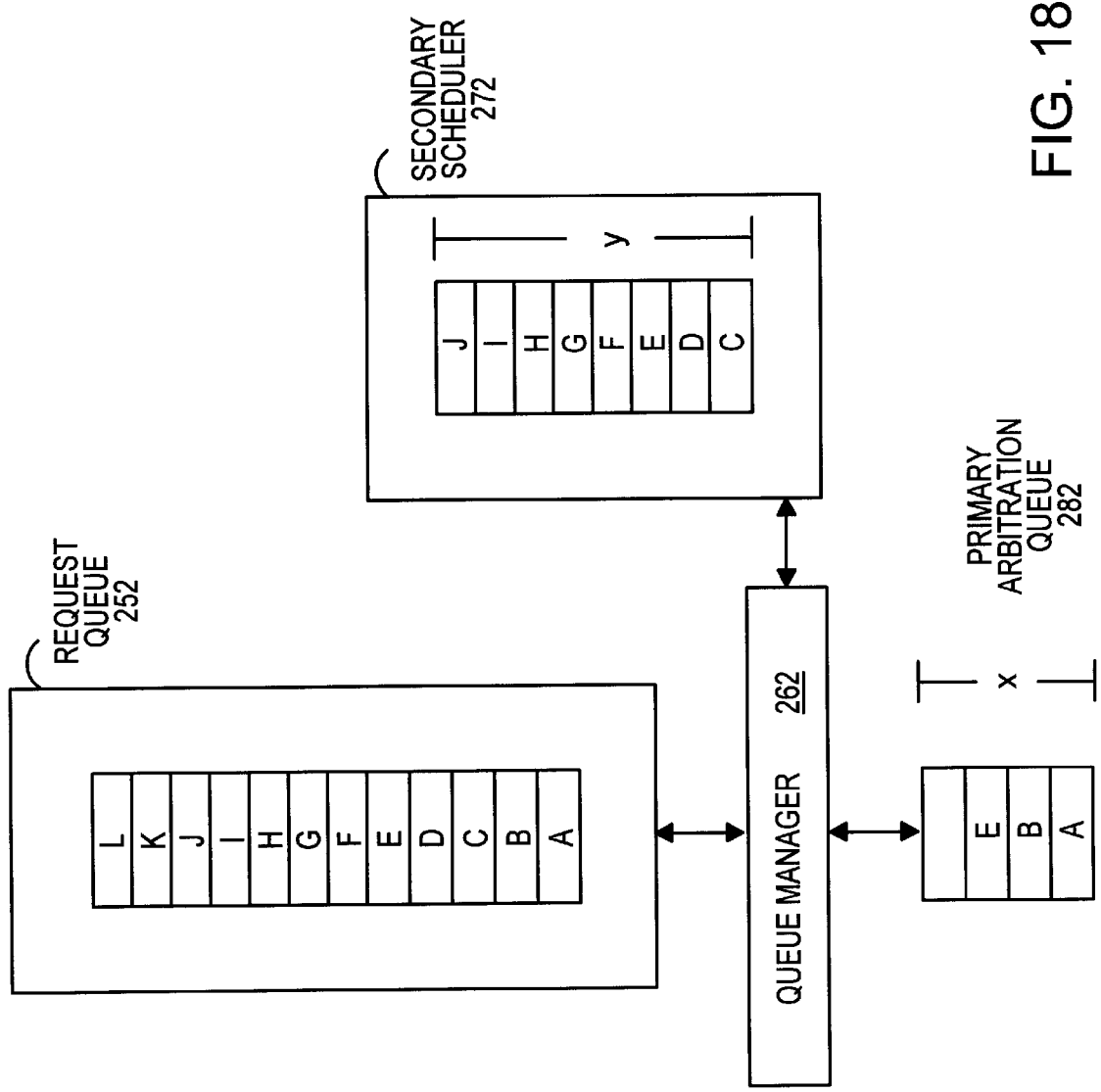
FIG. 18 is a depiction of a preferred architecture within an I/O controller for supplying new requests to a scheduler where one port is connected to the I/O controller in accordance with the invention.

FIG. 18 is a depiction of a preferred architecture within an I/O controller that has one port connected to the I/O controller and supports a packet priority scheme that is only based upon time. The request queue 252 is depicted as containing space for twelve time-ordered requests (where A is the oldest request and L is the youngest request) and the copy of the primary arbitration queue 282 contains space for four requests. The four request spaces in the primary arbitration queue are designated by the queue depth "x." The secondary scheduler arbitrates among "y" requests, where "y" is preferably 8. The "y" requests considered by the secondary scheduler include the sequence of requests from the request queue 252 that begins with the oldest request that is not in the primary arbitration queue.

For example purposes, it is assumed that the request queue 252 contains the time-ordered request sequence A through L and the primary arbitration queue 282 contains requests A, B, and E. As stated, the secondary scheduler arbitrates among a sequence of eight requests from the request queue 252, beginning with the oldest request that is not contained in the primary arbitration queue. Referring to the secondary scheduler 272, the eight, or "y," requests include the sequence of requests from C through J. Request E is included in the secondary scheduler even though it is already contained in the primary arbitration queue. Request E was previously supplied to the primary arbitration queue by the secondary scheduler because higher priority requests (i.e., requests C and D) had conflicting output channel requests, while E did not have any output channel conflicts. Request E is maintained in the secondary scheduler queue in an invalid state (so that it is not selected again) until there are no longer any older requests pending in the primary arbitration queue, at which point the secondary scheduler queue is advanced and request E is removed. The secondary scheduler can be designed to eliminate requests such as E that are already contained in the primary arbitration queue, however including the redundant requests in the secondary scheduler is preferred for simplicity of implementation.

In accordance with the invention, the secondary scheduler arbitrates among the "y" requests each time a new request is needed by the primary scheduler. In the preferred embodiment, the goal of the secondary scheduler is to select the oldest request that is requesting an output channel or output channels that do not conflict with the output channel requests of those requests that are presently being held in the primary arbitration queue.

Figure 19:
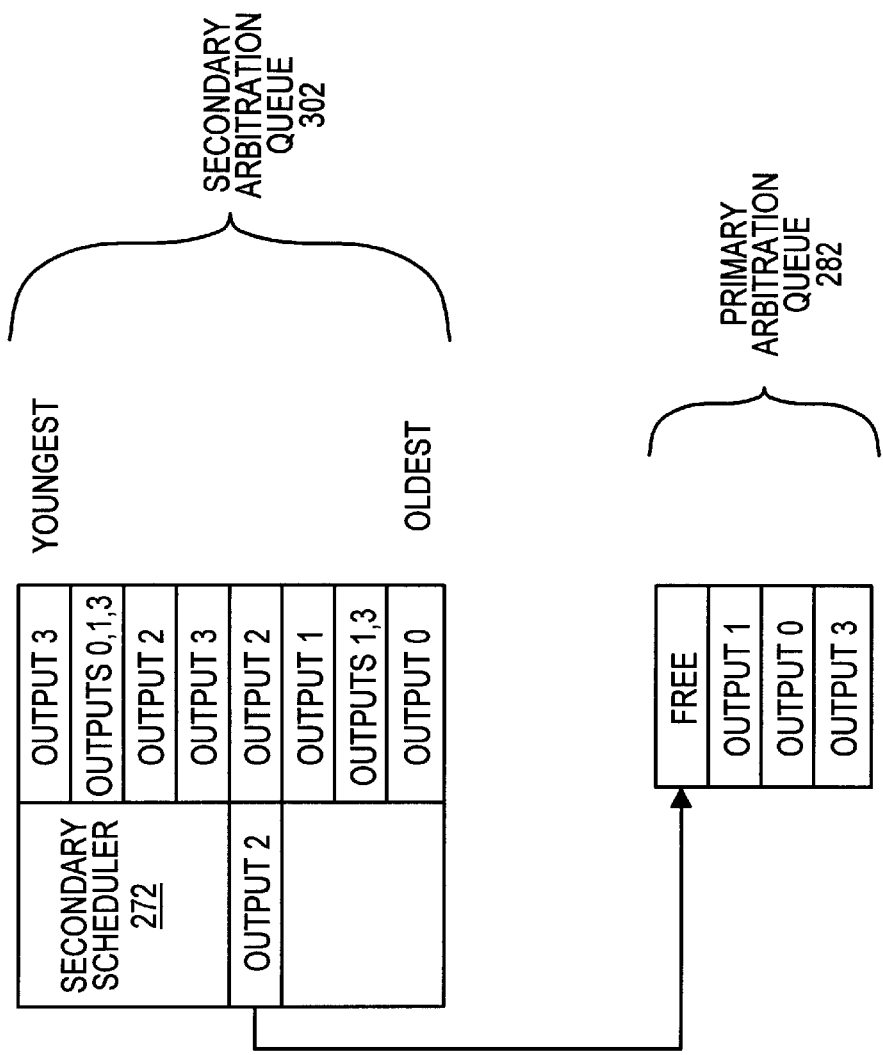
FIG. 19 is an example of the arbitration process for supplying a new request to a scheduler using the architecture of FIG. 18 in accordance with the invention.

FIG. 19 is an example of how the arbitration process works for the case where the secondary scheduler 272 arbitrates among eight requests to supply the primary scheduler with one new request. The requests in the secondary arbitration queue 302 are ordered from oldest to youngest, with the oldest request being at the bottom of the queue and the youngest request being at the top of the queue. The output channels requested by each request are identified in the queue by the crossbar exit channel descriptor (CEP). The primary arbitration queue 282 has three requests accessible to the primary scheduler and needs one new request to fill a free primary arbitration queue location. The requests present in the primary arbitration queue are requesting output channels 3, 0 and 1, respectively. The secondary scheduler is in communication with the queue manager 262 of FIGS. 17 and 18, which is in communication with the primary arbitration queue. The secondary scheduler goes through an arbitration process that involves comparing the requests in the secondary scheduler to the output channels requested in the primary arbitration queue.

In the example of FIG. 19, the secondary scheduler 272 first compares the oldest request in the secondary arbitration queue 302 (which identifies output channel 0) to the primary arbitration queue 282. Since there is a conflict at output channel 0, the oldest request is bypassed. The next youngest request (which identifies output channels 1 and 3) is then compared to the primary arbitration queue and there is a conflict at both output channels 1 and 3. The next youngest request (which identifies output channel 1) is then compared to the primary arbitration queue and there is a conflict at output channel 1. Finally, the next youngest request identifies output channel 2, which does not conflict with any of the output channels requested in the primary arbitration queue. Since the request is the oldest request that does not identify a conflicting output channel, the request is supplied to the primary scheduler as the new request, and as a result, the newly supplied primary arbitration queue has a distribution of output channels (channels 0, 1, 2, and 3) that increases the chances that some or all of the output channels will be utilized in the next arbitration cycle.

Figure 20:
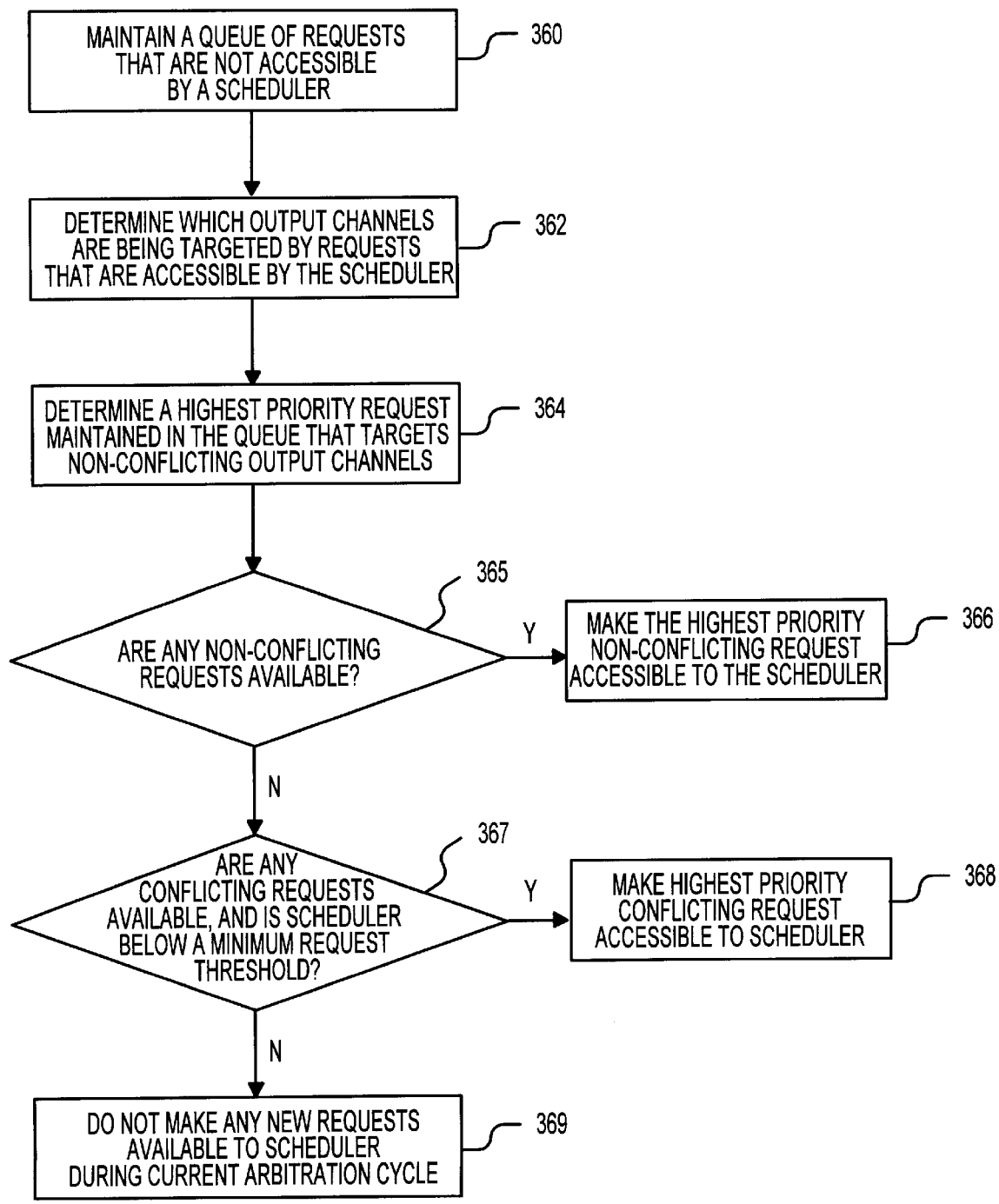
FIG. 20 is a flow diagram of a method for supplying a scheduler with a new request in accordance with the invention.

FIG. 20 is a depiction of the preferred method for supplying requests to a primary scheduler of a multiport switch. Step 360 involves maintaining a queue of output channel requests that are not accessible by the scheduler. Step 362 involves determining which output channels are being targeted by output channel requests that are accessible by the scheduler. Step 364 involves determining a highest priority request maintained in the queue that is targeting an output channel or channels that is or are not the same as an output channel targeted by the output channel requests that are accessible by the scheduler. When the primary scheduler is available to access a new output channel request, step 366 involves making the highest priority request accessible by the scheduler.

In a preferred embodiment of the invention, a minimum request threshold is established for the primary arbitration queues. The minimum request threshold dictates the minimum number of requests that should be maintained in the primary arbitration queue at any time, as long as there are pending requests available. In the preferred embodiment, a minimum request threshold of two requests indicates that two requests should always be maintained within each primary arbitration queue. The minimum request threshold is a programmable value that can be adjusted on a channel-by-channel basis to tune the performance of the queuing algorithm for each channel. For example, in channels that support one or two ports, the I/O controllers typically have shorter latency in responding to requests and supplying new requests and as a result, a threshold of two requests is desired. In the channels that support eight ports, the I/O controllers typically have longer latency in responding to requests and supplying new requests and as a result, a threshold of four requests is desired. Minimum request threshold values of 0 and 1 have the effect of preventing any conflicting requests from being forwarded to the primary arbitration queue, which may be desirable in some implementations.

The minimum request threshold becomes important to filling the primary arbitration queue when the number of requests in the primary arbitration queue falls below the minimum request threshold. When the primary arbitration queue falls below the minimum request threshold, the queue is filled from the secondary scheduler with the next oldest non-conflicting request or the next oldest conflicting request if there are no non-conflicting requests available. This override of the queuing algorithm is put in place to avoid the situation where conflicting requests are not supplied to the primary arbitration queue and because of latency in the system, an arbitration cycle is performed without a request present.

In light of the enhancement, some additional steps are included in the method of FIG. 20. Firstly, between steps 364 and 366 at logic point 365, it must be determined whether or not there are any non-conflicting requests available in the secondary scheduler queue. If there are non-conflicting requests available in the secondary scheduler queue, then at step 366 the highest priority non-conflicting request is made accessible to the scheduler. If there are no non-conflicting requests available in the secondary scheduler queue, then at decision point 367 it must be determined whether or not there are any conflicting requests in the secondary scheduler queue and whether or not the primary arbitration queue of the scheduler is below its minimum request threshold. If both conditions are met, at step 368, the highest priority conflicting request is made accessible to the scheduler. If on the other hand both conditions are not met, at step 369, no new requests are made available to the scheduler during the current arbitration cycle.

Figure 21:
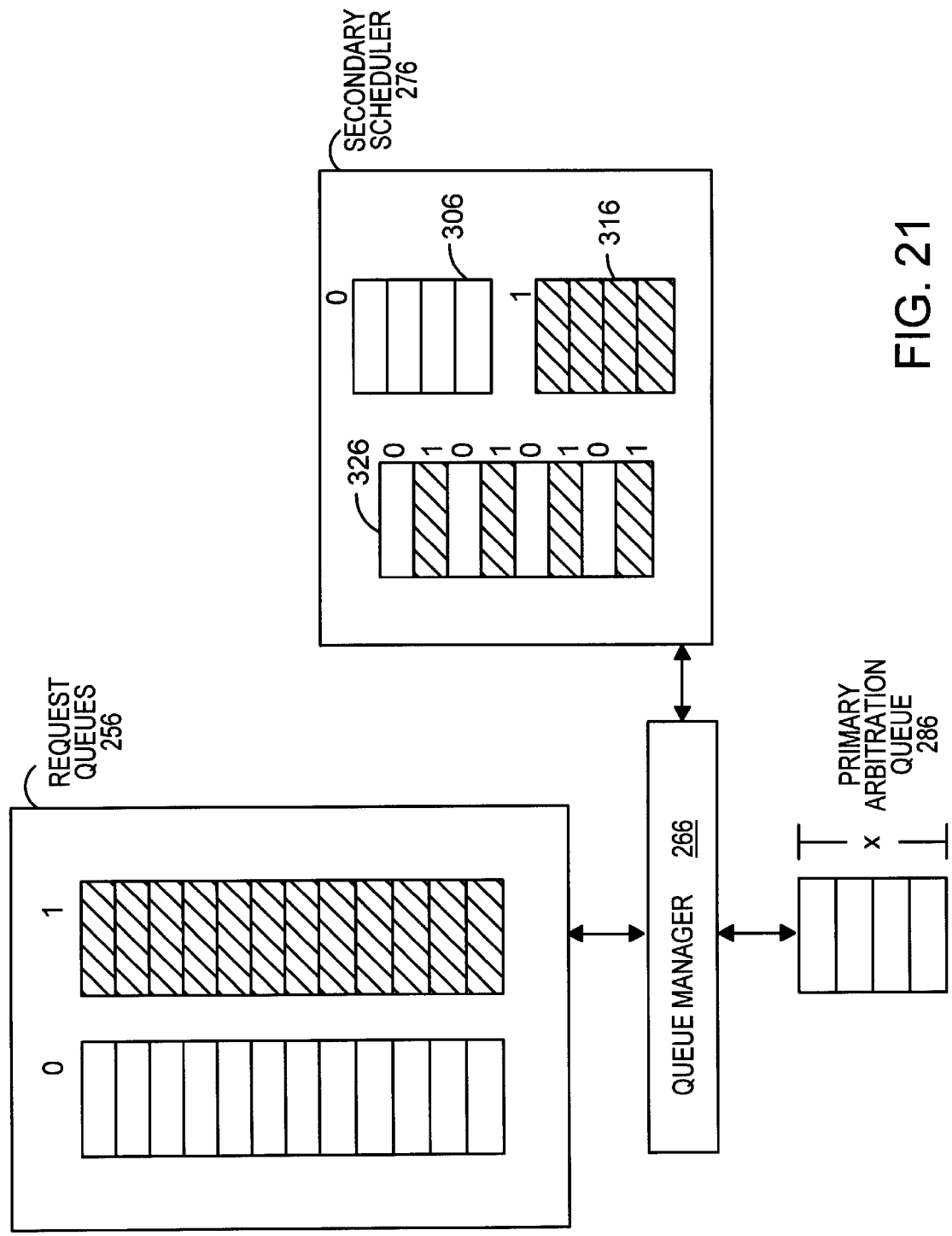
FIG. 21 is a depiction of a preferred architecture within an I/O controller for supplying new requests to a scheduler where two ports are connected to the I/O controller in accordance with the invention.

FIG. 21 is a depiction of a preferred architecture within an I/O controller for supplying the primary scheduler 132 with a new request in the case where two ports are connected to the I/O controller 246. Similar to FIG. 18, the primary arbitration queue 286 stores x requests, where x is preferably 4. There are two request queues 256 that correspond to the two connected ports. Each of the two request queues stores some number of requests in addition to the requests that make up the primary arbitration queue. In the example, the request queues store twelve requests each, although this is not critical.

The secondary scheduler 276 maintains four-deep request queues 306 and 316, related to the two ports, of the sequence of the four oldest requests, starting with the first request that is not included in the "x" requests. The four requests for each port are maintained individually on a time basis. The four requests are then interlaced in an alternating fashion to create a combined request queue 326 that has requests from both request queues, preferably four requests from each queue 306 and 316 for a total of eight requests. The time relationship is maintained between requests from the same request queue (i.e., queue "1" or queue "0"), but there is not necessarily a time relationship between the requests of the two queues. The secondary scheduler then arbitrates between the eight requests in the combined queue as depicted in FIG. 22 when the primary scheduler needs a new request.

Figure 22:
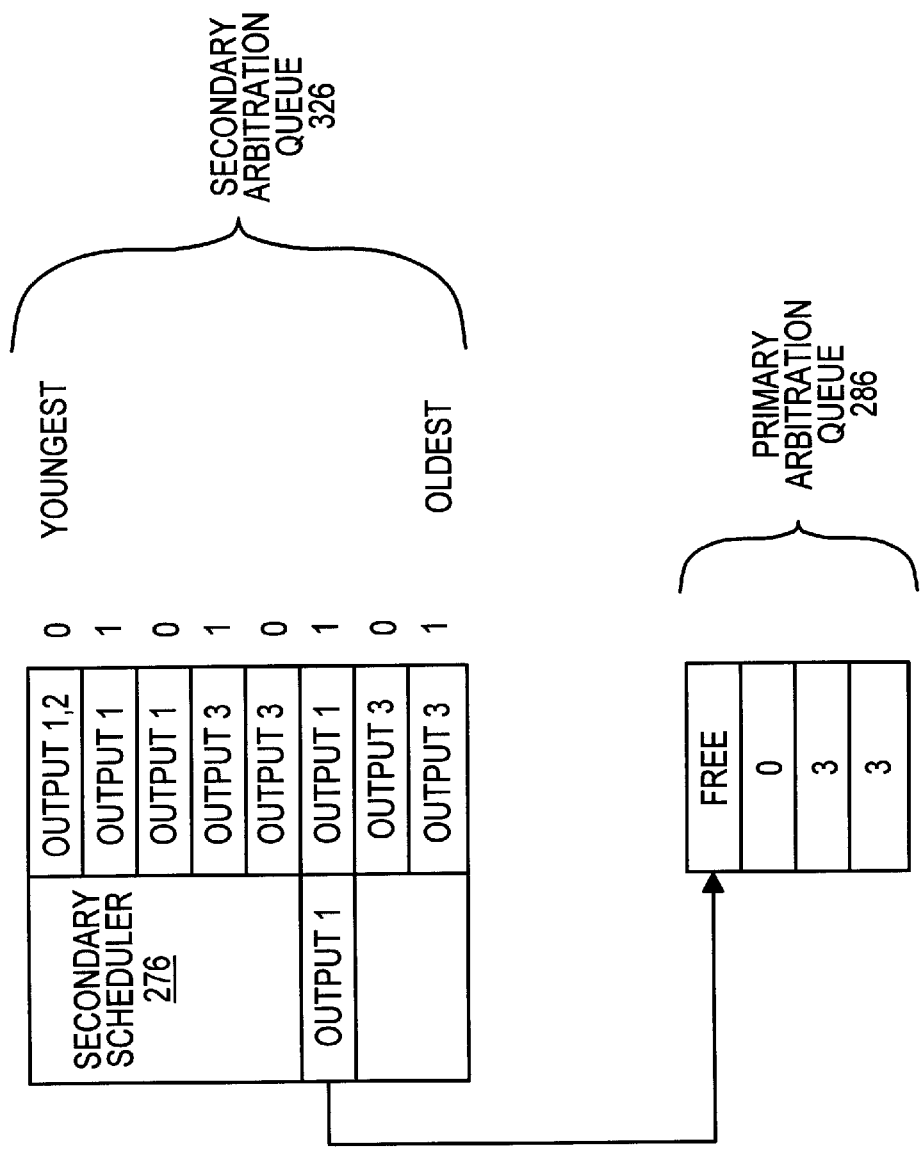
FIG. 22 is an example of an arbitration process for supplying a new request to a scheduler using the architecture of FIG. 21 in accordance with the invention.

In the example of FIG. 22, the primary arbitration queue 286 has two requests for output channel 3 (which occurs if all previous requests identified channel 3 and the minimum request threshold is two) and one request for output channel 0. The oldest request waiting in the secondary arbitration queue 326 also identifies output channel 3. If output channels 0 and/or 3 are unavailable to the three requests in the primary arbitration queue and the free space in the primary arbitration queue is filled from the secondary arbitration queue on a strictly FIFO basis, a blocking problem is created. All four of the requests in the primary arbitration queue are blocked and the entire input channel is unable to forward packets until output channels 0 and 3 become available. To avoid the blocking problem, in accordance with the arbitration method of the invention, the oldest request in the secondary arbitration queue within the secondary scheduler is bypassed and the next oldest request is reviewed. The next oldest request also conflicts with the primary arbitration queue at output channel 3. Finally, the next oldest request (which identifies output channel 1) is supplied to the primary arbitration queue. Under the multi-level primary arbitration process described above, the primary scheduler can now arbitrate between requests for three output channels (channels 0, 1, and 3) instead of just output channels 0 and 3.

When a request from the secondary arbitration queue that is not the oldest request is supplied to the primary arbitration queue as in FIG. 22, the secondary arbitration queue is not adjusted because, as explained with reference to FIG. 18, the secondary scheduler maintains the requests in time order even when an out of order request has been supplied to the primary arbitration queue. On the other hand, when the oldest request from one of the request queues 306 and 316 is supplied to the primary arbitration queue 286, the requests in the secondary scheduler 276 of FIGS. 21 and 22 adjust on a FIFO basis alternating between ports and add a new request to the top of the request queue 306 and 316 from the same port as the request that was supplied to the scheduler. The designation of higher arbitration priority between the two request queues 306 and 316 is also switched between the two queues each time a request from the queue with the higher arbitration priority is selected. That is, the oldest request associated with port 1 is the higher priority until a request from port 1 is supplied to the primary arbitration queue and then the arbitration priority is reversed to port 0. An advantage of the arbitration method is that the primary scheduler 132 is presented with a more broadly distributed primary arbitration queue from which to select packets for transfer through the switch.

Figure 23:
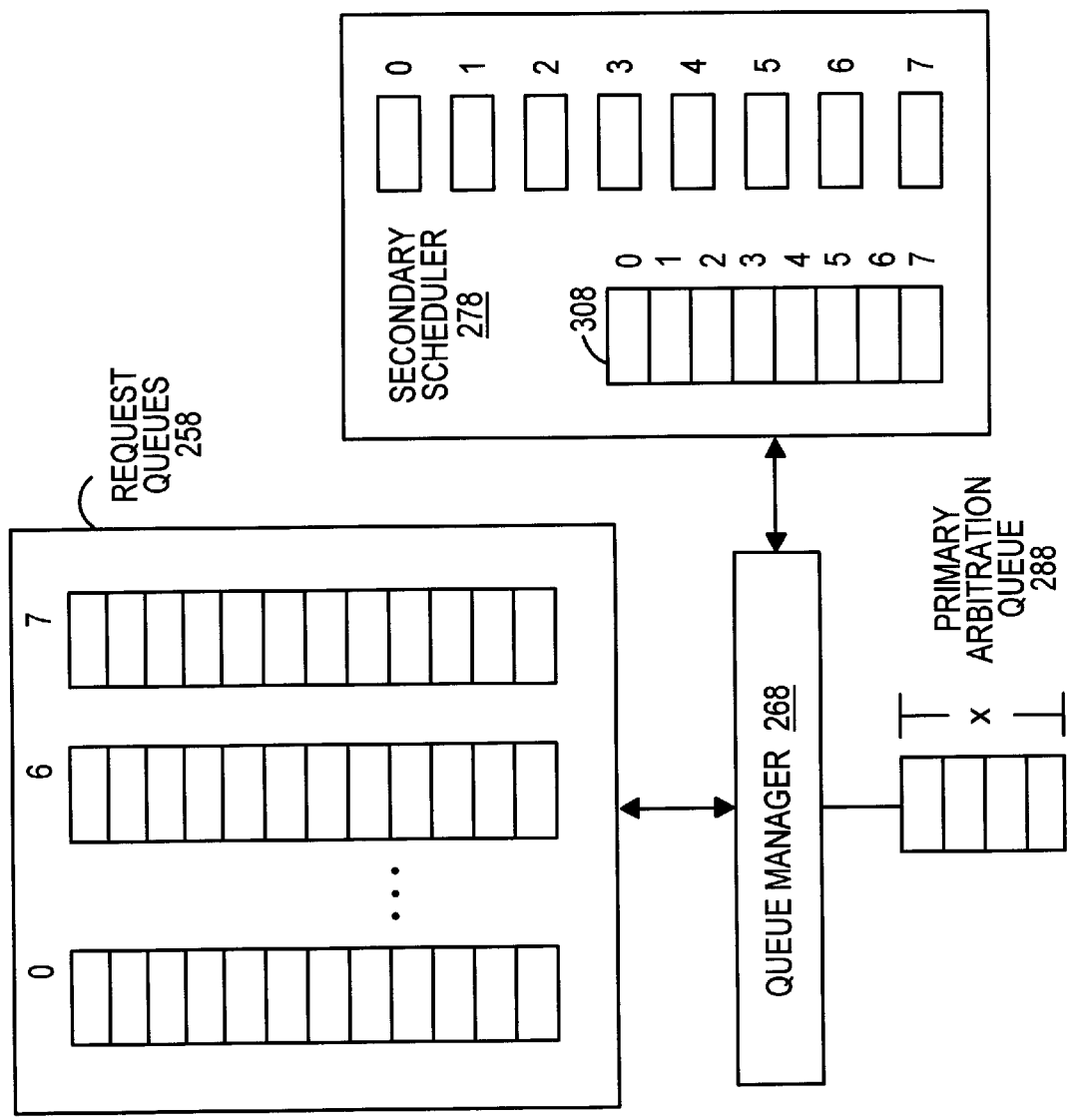
FIG. 23 is a depiction of a preferred architecture within an I/O controller for supplying new requests to a scheduler where eight ports are connected to the I/O controller in accordance with the invention.

FIG. 23 is a depiction of a preferred architecture within an I/O controller 248 of FIG. 17 for supplying the primary scheduler 132 with a new request in the case where eight ports are connected to the I/O controller. Similar to FIG. 18, the primary arbitration queue 288 stores "x" requests, where "x" is preferably 4 and each of the eight request queues 258 stores some number of requests in addition to the requests that make up the primary arbitration queue. In the example, the request queues store at least twelve requests each, although this is not critical.

The secondary scheduler 278 maintains one request, preferably the oldest request, from each of the eight request queues. The eight requests are used to create a combined secondary arbitration queue 308 that contains eight requests. The eight requests do not necessarily have a time relationship between each other and they are ordered based on their designated port numbers. Arbitration priority among the requests of the combined secondary arbitration queue is determined on a rotating round-robin basis. One port containing a request is identified by an arbitration pointer as the highest arbitration priority until the request associated with that port meets the arbitration requirements and is delivered to the primary arbitration queue. The arbitration pointer is incremented to the next port containing a request each time a highest arbitration priority request is supplied to the primary arbitration queue 288.

Figure 24:
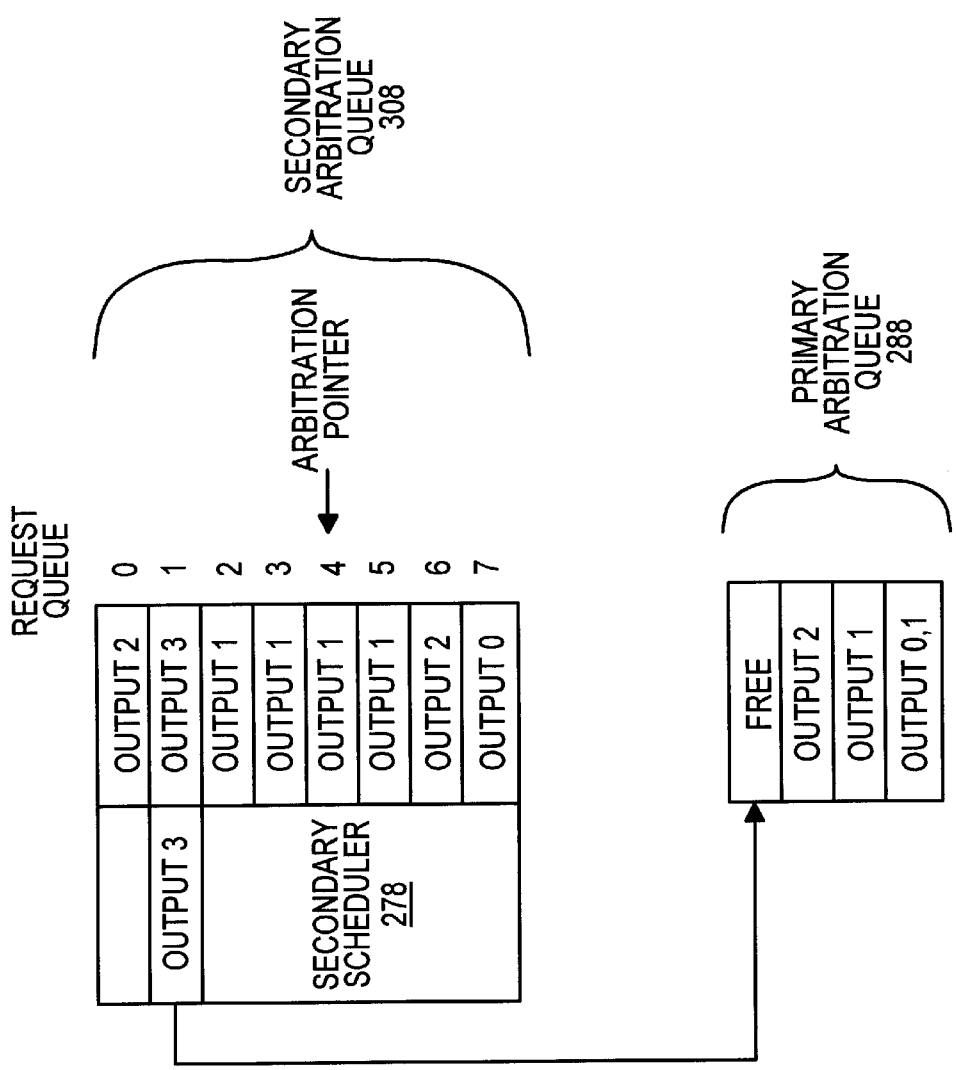
FIG. 24 is an example of the arbitration process for supplying a new request to a scheduler using the architecture of FIG. 22 in accordance with the invention.

Referring to FIG. 24, the arbitration process is performed similar to the cases above, except that arbitration begins at the request identified with the arbitration pointer instead of the oldest request. In the example of FIG. 24, it is assumed that the arbitration pointer is at request 4. Under the arbitration scheme, request 4 has a conflict with the primary arbitration queue 288 at output channel 1, as does the next priority request, request 5. Requests 6 and 7 have a conflict at output channels 2 and 0, respectively. The next request reviewed is request 0. Request 0 has a conflict at output channel 2 and, therefore, request 1 is next in order for review. Request 1 does not have any output channel conflicts and, therefore, the request for output channel 3 is supplied to the primary arbitration queue. In the preferred embodiment, the arbitration pointer is not incremented because the request with the arbitration pointer was not supplied to the primary arbitration queue.

FIGS. 18, 19, 21, 22, 23 and 24 and the previous three examples are all for situations in which packets and their associated requests have time as the only packet priority parameter. In other embodiments of the invention, packets may have a packet priority parameter in the place of, or in addition to, the time parameter. For example, in a preferred embodiment, packets can be separated into packet priorities based on the application type stored within the packet (i.e., audio, video, e-mail, database applications, etc.). As described above, four packet priority levels may be designated as control, high, medium, and low, where control is the highest priority and low is the lowest priority.

Figure 25:
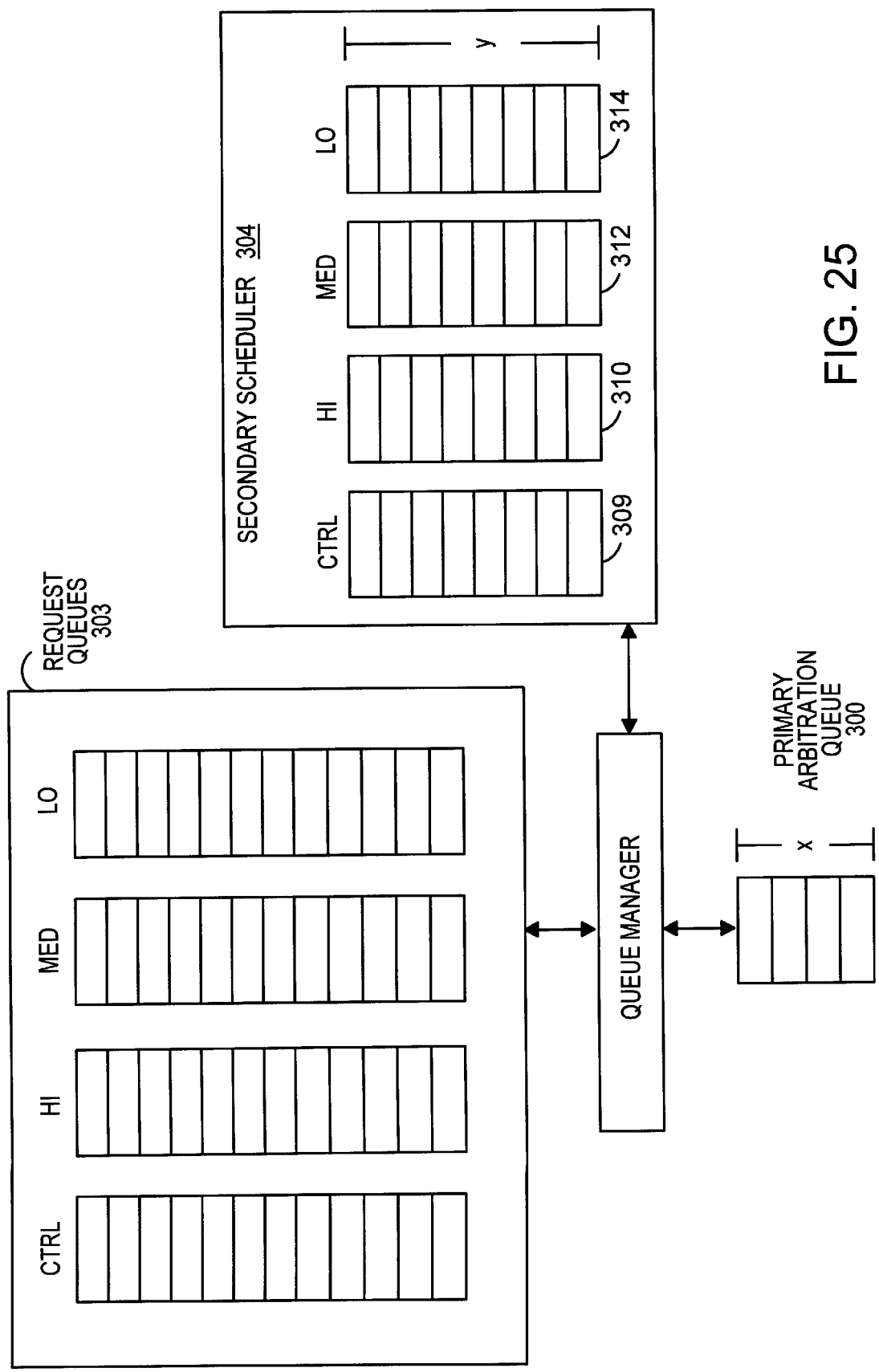
FIG. 25 is a depiction of a preferred architecture within an I/O controller for supplying new requests to a scheduler where one port is connected to the I/O controller and the I/O controller supports four packet priority levels in accordance with the invention.

FIG. 25 is a depiction of a preferred architecture within an IO controller for supplying the scheduler with a new request in the case in which one port is connected to the I/O controller and the switch supports four different packet priority levels. Similar to FIGS. 18, 21, and 23, the primary arbitration queue 300 contains "x" requests, where "x" is preferably 4, and four request queues 303 store at least twelve requests each, where at least eight of the requests in the request queues do not overlap with the requests of "x." The secondary scheduler 304 maintains a "y" deep request queue for each packet priority level where "y" is preferably 8. In FIG. 25, there are four request queues 309, 310, 312 and 314 of eight requests for the secondary scheduler to consider when a queue space becomes available in the primary arbitration queue 300. The arbitration approach of the secondary scheduler is based on the packet priority of the requests and the age of the request relative to other requests of the same packet priority. For example, when a new request is needed in the primary arbitration queue 300, the "control" priority secondary arbitration queue 309 is reviewed first and the oldest non-conflicting request in the control priority secondary arbitration queue is selected and supplied to the primary arbitration queue. If there are no requests stored in the control priority secondary arbitration queue, then the next priority queue is reviewed and so on, until a queue containing requests is found. If there are no non-conflicting requests in the highest priority queue that has requests and the minimum request threshold is met, no new requests are supplied to the primary arbitration queue and the next priority level queue is not reviewed during that round of arbitration. For example, if the primary arbitration queue was supplied to the minimum request threshold with requests for output channel 1 and the control priority queue of the secondary scheduler is filled with requests for output channel 1, the primary arbitration queue will not be filled with a conflicting request from the control priority queue and in addition the primary arbitration queue will not be supplied with a request from the high priority queue even if it contains a non-conflicting request. The reservation of the primary arbitration queue is necessary to allow the scheduler to maintain the designated priority hierarchy.

Figure 26:
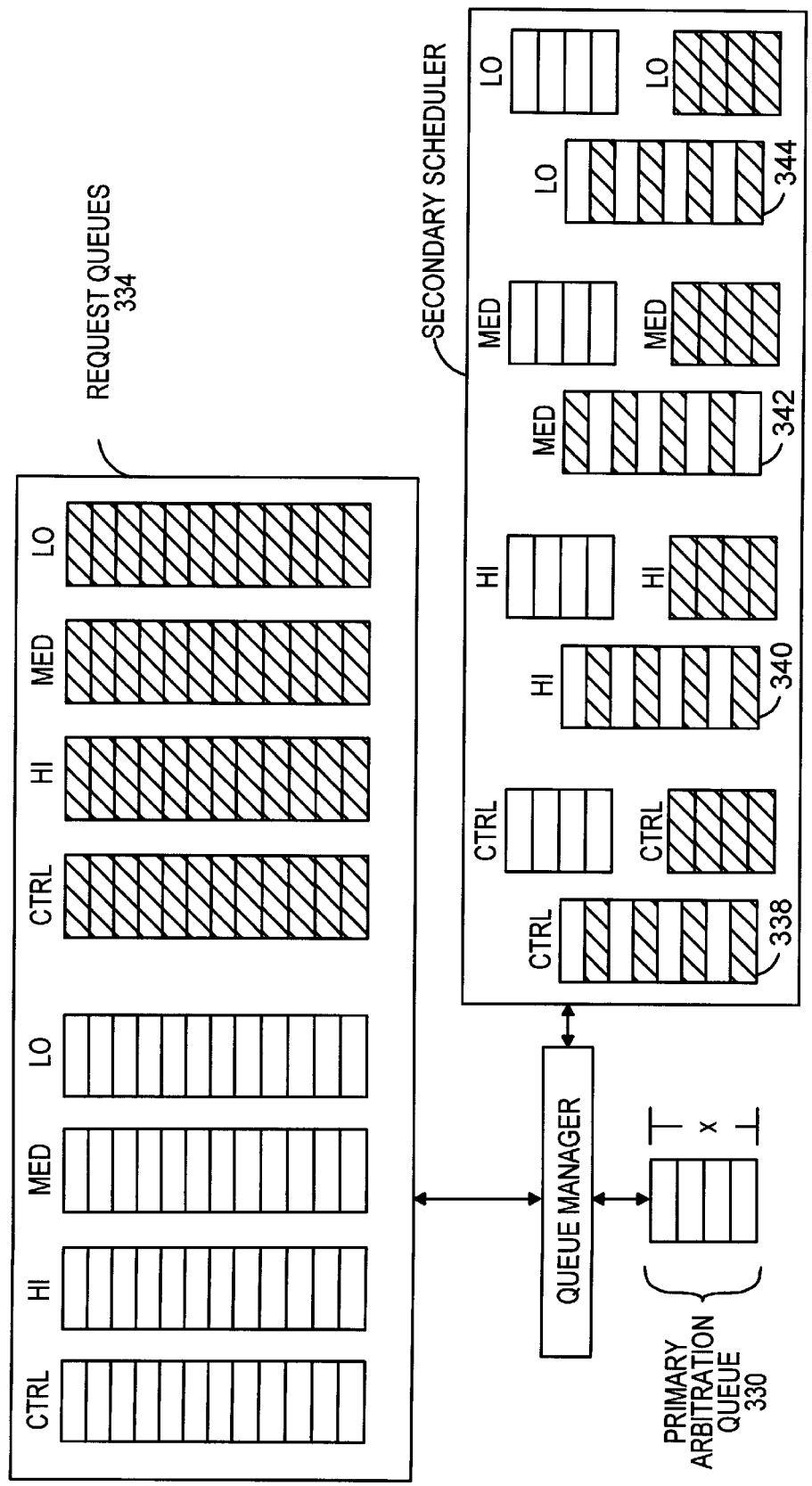
FIG. 26 is a depiction of a preferred architecture within an I/O controller for supplying new requests to a scheduler where two ports are connected to the I/O controller and the I/O controller supports four packet priority levels in accordance with the invention.

FIG. 26 is a depiction of a preferred architecture of an I/O controller for supplying the scheduler with a new request in the case in which two ports are connected to the I/O controller and the switch supports four different packet priorities. As in FIG. 25, the packet priorities are designated as priority levels "control" through "low," where control is the highest priority and low is the lowest priority. The primary arbitration queue 330 contains "x" requests, where "x" is preferably 4, and each of the eight request queues 334 preferably stores at least twelve requests.

As described with reference to FIGS. 21 and 22, combined secondary arbitration queues 338, 340, 342 and 344 are created for each of the packet priority levels by interlacing requests from the two ports into eight-deep request queues. A separate request queue is generated for each packet priority level. The highest priority secondary scheduler queue that contains requests is selected and the queuing arbitration algorithm is applied to the selected queue to identify a request to supply to the primary arbitration queue. There is not necessarily a time relationship between requests from the two different ports in the combined secondary arbitration queues and the arbitration priority between the requests from the two ports is switched from one port to the other in an alternating fashion when a request with the highest arbitration priority is supplied to the scheduler.

Although the case of eight ports and four packet priorities is not depicted, the arbitration approach described with reference to FIG. 23 can be used for each packet priority level. As stated above, the invention can be implemented with varying combinations of ports and packet priority designations while maintaining the fundamental goal of supplying the primary arbitration queue with a new request that targets output channels that are not included in the primary arbitration queue. Further, although the secondary arbitration is completed in a channel-specific manner, in an alternative embodiment, the secondary schedulers have knowledge of output channels that are requested on other I/O controllers, thereby allowing each secondary scheduler to provide a broader output channel distribution to the primary scheduler.

As another alternative, in the cases where there are more than one packet priority level and the primary arbitration queue for each channel module is packet priority specific, the primary arbitration queue of each channel module can be filled from each different priority level queue of the secondary scheduler. That is, the control priority level register in the primary arbitration queue will only be filled with requests from the control priority queue in the secondary scheduler and so on for each priority level.

In one enhancement of the preferred embodiment of the invention, if the highest priority request in a secondary scheduler is a multicast request, then the multicast request is supplied to the primary arbitration queue, even if the multicast request has conflicting output channels. A conflicting multicast request is forwarded over other non-conflicting requests when it is the highest priority request in an effort to ensure that multicast requests do not get continually passed over in the secondary arbitration process. In a slight variation of the enhancement, a multicast request can be allowed to stay in the highest priority request position of the secondary scheduler for a designated period of time to see if the multicast request will be supplied to the primary arbitration queue under the standard queuing algorithm. After the expiration of the time period, the multicast request is automatically the next request to be forwarded to the primary arbitration queue.

In another enhancement of the preferred embodiment, bridged network traffic is queued slightly differently than routed network traffic. Bridged network traffic is traffic that is forwarded based on layer 2 (i.e., ethernet) protocols and routed network traffic is traffic that is forwarded based on layer 3 (i.e., IP/IPX) protocols. In the enhancement, output channel requests for bridged packets that come from the same input port and that are requesting overlapping output channels must be queued through the switch fabric in time order even if the older requests contain requests that conflict with output channels in the primary arbitration queue. In effect, the queuing algorithm is overridden when a series of bridged packets with overlapping output channel requests arrives on the same input port in order to keep the proper time sequence among the series of packets.

What is claimed is:

1. A method of supplying requests to a scheduler of a multiport switch having a plurality of outputs, said scheduler having access to a plurality of first output requests, said method comprising the steps of:

maintaining a queue of second output requests that are not accessible by said scheduler, each second output request being indicative of at least one target output;

determining which outputs are target outputs of said first output requests that are accessible by said scheduler;

selecting a highest priority request of said second output requests at least partially based on identifying a particular second output request for which indicated target outputs are mutually exclusive with said target outputs of said first output requests; and providing access of said highest priority request to said scheduler.

2. The method of claim 1 further comprising steps of:

arbitrating between said first output requests that are accessible by said scheduler;

issuing grants to said first output requests when targeted outputs are available; and forwarding packets that are related to granted first output requests through said multiport switch.

3. The method of claim 1 wherein said step of selecting a highest priority request includes a step of assigning a continuum of time-based priority indicators to each said second output request such that a second output request having an oldest time-based priority indicator has a highest priority and a second output request having a youngest time-based priority indicator has a lowest priority.

4. The method of claim 1 wherein said step of selecting further includes a step of sequencing a priority indicator among said second output requests.

5. The method of claim 1 wherein said step of selecting said highest priority request includes a step of assigning said highest priority to a request when said request is the oldest request of said second output requests and said request is for multiple outputs even if one of said target outputs is not mutually exclusive with said target outputs of said first output requests.

6. The method of claim 1 wherein said step of selecting said highest priority request includes additional steps of determining if there are more than one request from a same input that are requesting overlapping outputs and that are being bridged, and assigning said highest priority, in succession, to said requests from said same input even if one of said target outputs is not mutually exclusive with said target outputs of said first output requests.

7. A multiport packet switching system having a multi channel switch fabric, a data path multiplexer and a scheduler, wherein said scheduler grants requests for forwarding packets through said multiport packet switching system comprising:

means for queuing second output channel requests that are inaccessible by said scheduler;

means for determining which output channels are target output channels of first output channel requests that are accessible by said scheduler;

means for determining a highest priority request maintained in said queuing means that is indicative of only target output channels that are different than said target output channels of said first output channel requests; and means for delivering said highest priority request to a location that is accessible by said scheduler when said scheduler is free to access a new request.

8. The system of claim 7 wherein each switch fabric channel is operatively associated with an independent arrangement of said means for queuing, said means for determining requested output channels, said means for determining a highest priority request, and said means for delivering.

9. The system of claim 7 wherein said meains for queuing includes a separate request queue for each input port in said multiport packet switching system.

10. The system of claim 9 wherein said means for determining a highest priority request is responsive to more than one of said separate request queues.

11. The system of claim 7 wherein said means for determining which output channels are target output channels of said first output channel requests is responsive to a multilevel request buffer that is connected in parallel to said scheduler.

12. The system of claim 7 wherein said means for queuing includes separate request buffers for requests that are prioritized by application type.

13. A method of supplying requests to a scheduler in a multiport switch that has a switch fabric with a plurality of switching channels and output ports associated with said switching channels comprising the steps of:

identifying output channels targeted by any first requests from a particular switching channel that are available to said scheduler for arbitration;

comparing said identified output channels to output channels that are targeted by second requests from said particular switching channel that are not available to said scheduler for arbitration; and making available to said scheduler a second request that does not target an output channel that is the same as one of said identified output channels targeted by any of said first requests, said second request being one of said second requests from said particular switching channel that are not available to said scheduler for arbitration before being made available to said scheduler.

14. The method of claim 13 where said step of making available includes identifying and accessing a highest priority request from said requests.

15. The method of claim 14 wherein said step of identifying and accessing said highest priority request includes a step of determining said highest priority request based on comparing time indicators related to said second requests.

16. The method of claim 13 wherein said step of making available is preceded by:

determining if the number of said first requests meets a minimum request threshold;

if said minimum request threshold is not met and if there are no second requests that target only output channels that are different from said identified output channels, making available to said scheduler a highest priority second request even if said highest priority second request targets an output channel that is the same as one of said identified output channels; and overriding said step of making available to said scheduler a second request that does not target an output channel that is the same as one of said identified output channels.

17. The method of claim 13 wherein said step of making available is preceded by a step of receiving an indication that said scheduler is free to access a new request.

18. The method of claim 13 wherein said step of identifying output channels includes a step of accessing said first requests from a multi-level request queue in which said queue is connected in parallel to said scheduler.

19. The method of claim 18 further including steps of:
arbitrating between said first requests from said multi-level request queue;
issuing grants on a priority basis to said first requests from said multi-level request queue when requested output channels are available; and
forwarding packets that are related to granted first requests through said multiport switch.

20. The method of claim 13 further including a step of maintaining a request queue for each port of said multiport switch and wherein said step of comparing includes a step of arbitrating between second requests from all queues related to ports of said particular switching channel.

* * * * *